(12) United States Patent
Diorio et al.

(10) Patent No.: US 7,830,262 B1
(45) Date of Patent: Nov. 9, 2010

(54) ADJUSTING COMMUNICATION PARAMETERS WHILE INVENTORYING RFID TAGS

(75) Inventors: Christopher J. Diorio, Shoreline, WA (US); Aanand Esterberg, Seattle, WA (US); David Ord, Aliso Viejo, CA (US); Michael H. Thomas, Wake Forest, NC (US); Kurt E. Sundstrom, Woodinville, WA (US)

(73) Assignee: Impinj, Inc., Seattle, WA (US)

( * ) Notice: Subject to any disclaimer, the term of this patent is extended or adjusted under 35 U.S.C. 154(b) by 296 days.

(21) Appl. No.: 12/133,180

(22) Filed: Jun. 4, 2008

Related U.S. Application Data

(63) Continuation-in-part of application No. 11/412,170, filed on Apr. 25, 2006, now Pat. No. 7,408,466, and a continuation-in-part of application No. 11/411,657, filed on Apr. 25, 2006, now Pat. No. 7,417,548, and a continuation-in-part of application No. 11/412,172, filed on Apr. 25, 2006, now Pat. No. 7,391,329.

(60) Provisional application No. 60/934,602, filed on Jun. 14, 2007, provisional application No. 60/956,171, filed on Aug. 16, 2007.

(51) Int. Cl.
*G08B 13/14* (2006.01)
*G04Q 5/22* (2006.01)
*H04B 1/10* (2006.01)

(52) U.S. Cl. ............... 340/572.4; 340/10.32; 340/10.4; 375/350

(58) Field of Classification Search ... 340/572.1–572.9, 340/10.1–10.6; 375/350
See application file for complete search history.

(56) References Cited

U.S. PATENT DOCUMENTS

| | | | |
|---|---|---|---|
| 3,938,316 A | 2/1976 | Morokawa et al. | |
| 4,454,483 A | 6/1984 | Baylor | |
| 4,673,932 A * | 6/1987 | Ekchian et al. | 340/10.32 |
| 5,117,756 A | 6/1992 | Goffin, II | |
| 5,438,694 A | 8/1995 | Muri et al. | |
| 5,565,858 A | 10/1996 | Guthrie | |
| 5,583,819 A | 12/1996 | Roesner et al. | |
| 5,649,295 A | 7/1997 | Shober et al. | |

(Continued)

FOREIGN PATENT DOCUMENTS

JP     2004-080607     3/2004

(Continued)

OTHER PUBLICATIONS

"Part 1 Technical requirements and methods of measurement [Electromagnetic compatability and radio spectrum Matters (ERM); Radio Frequency Identification Equipment operating in the band 865 MHz to 868 MHz with power levels up to 2 W]", *ETSI EN 302 208-1 V1.1.1* (Sep. 2004), 1-52.

(Continued)

*Primary Examiner*—Jennifer Mehmood
(74) *Attorney, Agent, or Firm*—Turk IP Law, LLC

(57) ABSTRACT

RFID reader systems, readers, components, software and methods are provided for inventorying RFID tags. In some embodiments, a population of RFID tags begins being inventoried using a first set of communication parameters, and then continues using a second set of communication parameters. This way, some RFID tags can be inventoried faster, without missing tags that require a longer time to read.

31 Claims, 16 Drawing Sheets

100

RFID SYSTEM

U.S. PATENT DOCUMENTS

| | | | |
|---|---|---|---|
| 5,649,296 A | | 7/1997 | MacLellan et al. |
| 5,673,037 A | * | 9/1997 | Cesar et al. ............... 340/10.32 |
| 5,686,902 A | | 11/1997 | Reis et al. |
| 5,701,127 A | | 12/1997 | Sharpe |
| 5,751,220 A | | 5/1998 | Ghaffari |
| 5,867,535 A | | 2/1999 | Phillips et al. |
| 5,912,632 A | | 6/1999 | Dieska et al. |
| 5,940,006 A | | 8/1999 | MacLellan et al. |
| 5,952,922 A | | 9/1999 | Shober |
| 6,023,198 A | | 2/2000 | McKinney et al. |
| 6,043,748 A | | 3/2000 | Touchton et al. |
| 6,046,683 A | | 4/2000 | Pidwerbetsky et al. |
| 6,064,320 A | | 5/2000 | d'Hont et al. |
| 6,127,928 A | | 10/2000 | Issacman et al. |
| 6,130,623 A | | 10/2000 | MacLellan et al. |
| 6,243,013 B1 | | 6/2001 | Duan et al. |
| 6,259,991 B1 | | 7/2001 | Nysen |
| 6,351,216 B1 | * | 2/2002 | Frederick et al. ......... 340/572.4 |
| 6,356,161 B1 | | 3/2002 | Nolan et al. |
| 6,388,532 B1 | | 5/2002 | Babcock |
| 6,404,325 B1 | | 6/2002 | Heinrich et al. |
| 6,472,943 B1 | | 10/2002 | Soong et al. |
| 6,600,905 B2 | | 7/2003 | Greeff et al. |
| 6,603,391 B1 | | 8/2003 | Greeff et al. |
| 6,639,509 B1 | | 10/2003 | Martinez |
| 6,664,860 B2 | | 12/2003 | Fallisgaard et al. |
| 6,784,789 B2 | | 8/2004 | Eroglu et al. |
| 6,917,291 B2 | | 7/2005 | Allen |
| 7,019,617 B2 | | 3/2006 | Pratt et al. |
| 7,026,935 B2 | | 4/2006 | Diorio et al. |
| 7,091,828 B2 | | 8/2006 | Greeff et al. |
| 7,120,550 B2 | | 10/2006 | Diorio et al. |
| 7,206,575 B1 | * | 4/2007 | Fielhauer et al. ............ 455/427 |
| 7,253,719 B2 | | 8/2007 | Diorio et al. |
| 7,283,037 B2 | | 10/2007 | Diorio et al. |
| 7,304,579 B2 | | 12/2007 | Diorio et al. |
| 7,352,318 B2 | * | 4/2008 | Osman et al. ................. 342/37 |
| 7,358,848 B2 | * | 4/2008 | Mohamadi ............... 340/10.34 |
| 7,391,329 B2 | | 6/2008 | Humes et al. |
| 7,405,660 B2 | | 7/2008 | Diorio et al. |
| 7,408,466 B2 | | 8/2008 | Diorio et al. |
| 7,417,548 B2 | | 8/2008 | Kavounas et al. |
| 7,432,814 B2 | | 10/2008 | Dietrich et al. |
| 7,436,308 B2 | | 10/2008 | Sundstrom et al. |
| 7,486,172 B2 | * | 2/2009 | Martinez et al. ........... 340/10.2 |
| 7,616,094 B2 | * | 11/2009 | Heinrich et al. ............ 340/10.2 |
| 2002/0167405 A1 | | 11/2002 | Shanks et al. |
| 2003/0174049 A1 | | 9/2003 | Beigel et al. |
| 2004/0012441 A1 | | 1/2004 | Mackey et al. |
| 2005/0099269 A1 | | 5/2005 | Diorio et al. |
| 2005/0099270 A1 | | 5/2005 | Diorio et al. |
| 2006/0044113 A1 | * | 3/2006 | Hashimoto et al. ......... 340/10.1 |
| 2006/0100001 A1 | | 5/2006 | Pratt et al. |
| 2006/0145855 A1 | | 7/2006 | Diorio et al. |
| 2006/0244598 A1 | | 11/2006 | Hyde et al. |
| 2006/0261952 A1 | | 11/2006 | Kavounas et al. |
| 2006/0261953 A1 | | 11/2006 | Diorio et al. |
| 2006/0261954 A1 | | 11/2006 | Dietrich et al. |
| 2006/0261955 A1 | | 11/2006 | Humes et al. |
| 2006/0261956 A1 | | 11/2006 | Sundstrom et al. |
| 2007/0177694 A1 | * | 8/2007 | Okunev et al. .............. 375/333 |
| 2007/0221737 A2 | | 9/2007 | Diorio et al. |

FOREIGN PATENT DOCUMENTS

| | | |
|---|---|---|
| WO | WO02065380 | 8/2002 |
| WO | WO-2005048312 A2 | 5/2005 |
| WO | WO-2005048612 A1 | 5/2005 |

OTHER PUBLICATIONS

"Part 2 Harmonized EN under article 3.2 [Electromagnetic compatability and radio spectrum Matters (ERM); Radio Frequency Identification Equipment operating in the band 865 MHz to 868 MHz with power levels up to 2 W]", *ETSI EN 302 208-2 V1.1.1*, (Sep. 2004), 1-17.

Finkenzeller, Klaus, "Fundamental Operating Principles", *RFID Handbook; Fundamentals and Applications in Contactless Smart Cards and Identification*, John Wiley & Sons, Ltd ; ISBN 0-470-84402-7, (2003), 29-59.

International Search Report for Application No. PCT/US01/37387 mailed Mar. 24, 2005.

"Declaration of Stacy L. Jones authenticating attached website materials", www.autoid.org/SC31/sc_31_wg4_sg3.htm Sep. 1, 2006.

EPCglobal, Inc "Specification of RFID Air Interface-EPC Radio-Frequency Identity Protocols Class-1 Generation-2 UHF RFID Protocol for Communications at 860 MHz-960 MHz, Version 1.1.0." (a.k.a. "The Gen 2 Spec") EPCglobal Inc. Dec. 17, 2005.

EPCglobal, Inc "Specification of RFID Air Interface-EPC Radio-Frequency Identity Protocols Class-1 Generation-2 UHF RFID Protocol for Communications at 860 MHz-960 MHz, Version 1.0.8." (a.k.a. "The Gen 2 Spec") EPCglobal Inc. Dec. 14, 2004.

* cited by examiner

100

*RFID SYSTEM*

220

*RFID TAG*

FIG. 3      RFID SYSTEM COMMUNICATION

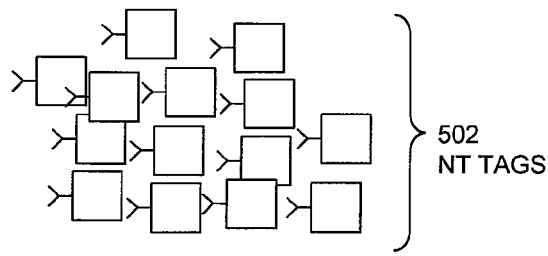
FIG. 5A  TAG POPULATION
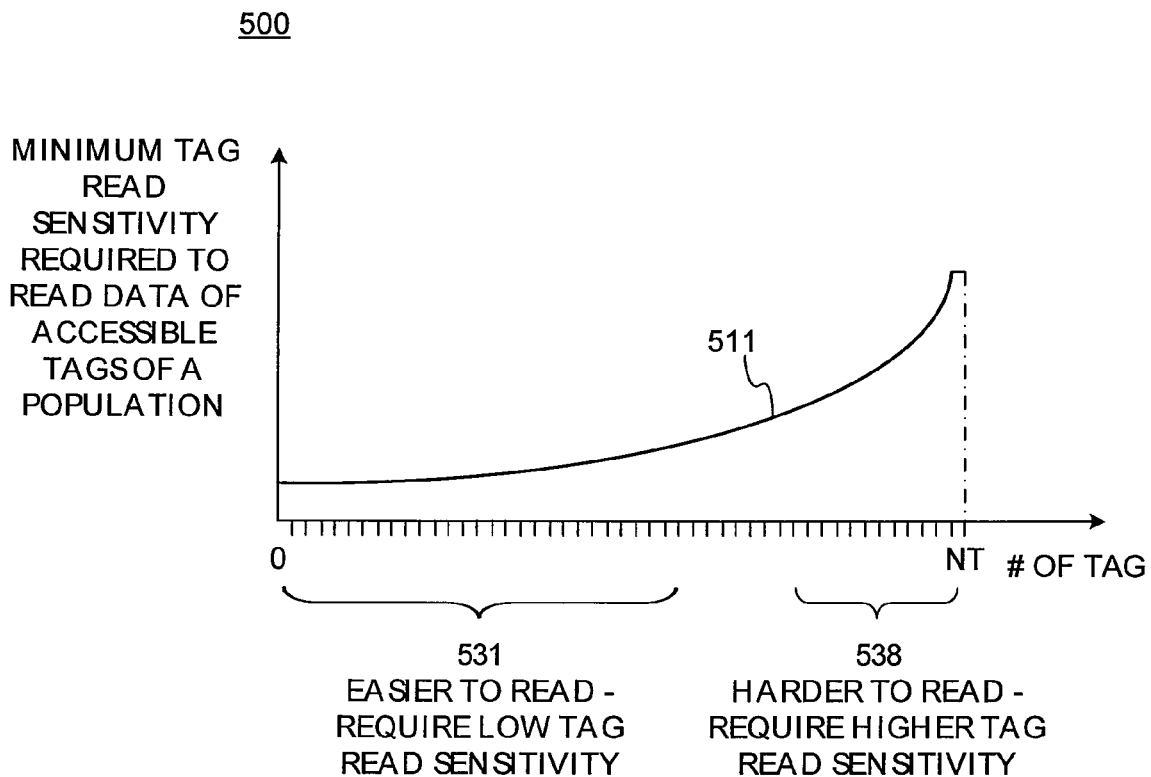
FIG. 5B  DIFFICULTY IN READING TAGS IN A POPULATION

*RFID READER SYSTEM DETAIL*

RFID READER SYSTEM CONFIGURATION WITH
OPTIONAL LOCAL AND REMOTE COMPONENTS

*READER METHODS WITH DYNAMIC ADJUSTMENT*

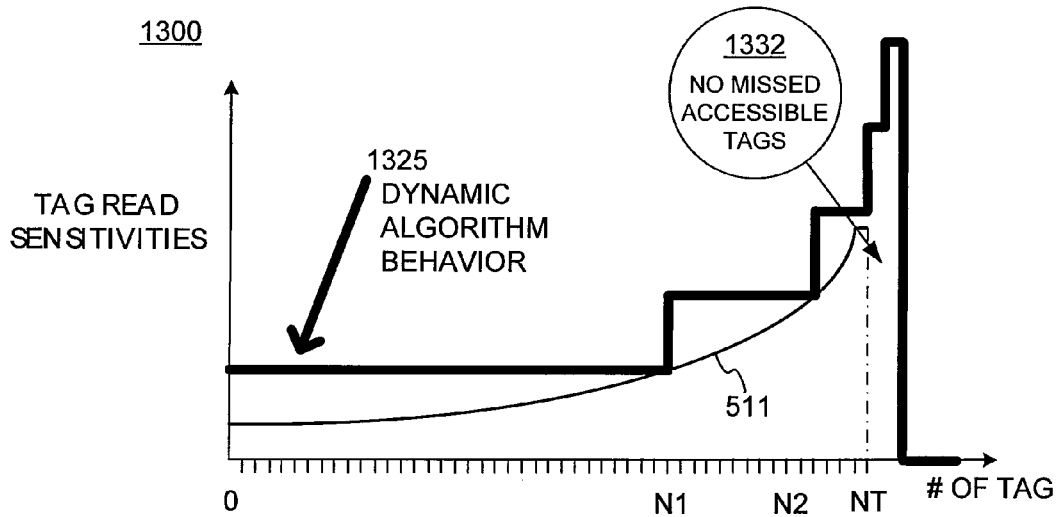
FIG. 13A READING WITH DYNAMIC ADJUSTMENT
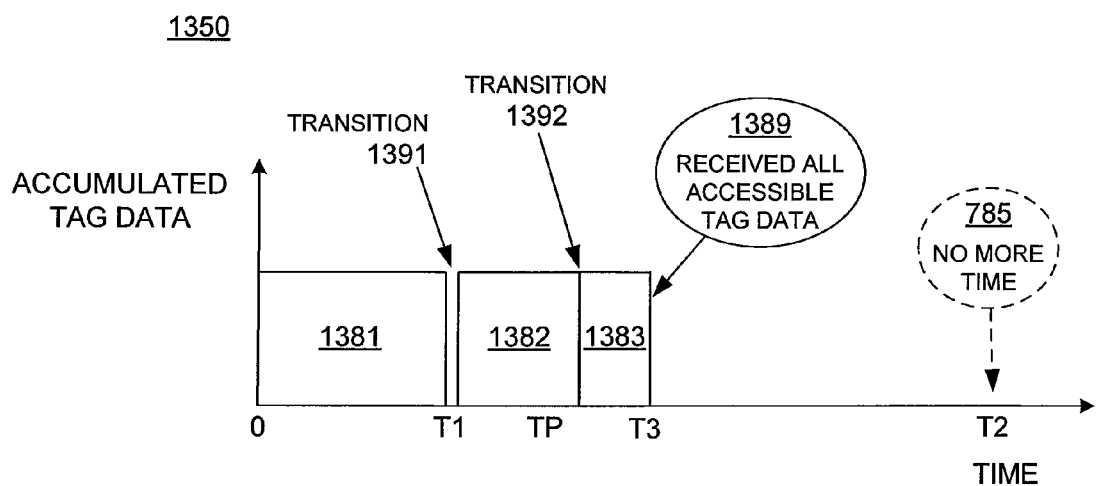
FIG. 13B RESULTS OF READING WITH DYNAMIC ADJUSTMENT

DETERMINING WHETHER TO CHANGE COMMUNICATION PARAMETER

DETERMINING WHETHER TO CHANGE COMMUNICATION PARAMETER

ADJUSTING COMMUNICATION PARAMETERS WHILE INVENTORYING RFID TAGS

CROSS REFERENCE TO RELATED APPLICATIONS

This application claims priority from U.S. Provisional Patent Application Ser. No. 60/934,602, filed on Jun. 14, 2007, and U.S. Provisional Patent Application Ser. No. 60/956,171, filed on Aug. 16, 2007, the disclosures of which are hereby incorporated by reference in their entirety.

This application is a Continuation-In-Part of application Ser. No. 11/412,170, filed Apr. 25, 2006, now U.S. Pat. No. 7,408,466 B2, issued Aug. 5, 2008, entitled "ADJUSTING RFID WAVEFORM SHAPE IN VIEW OF DETECTED RF ENERGY", commonly assigned herewith.

This application is a Continuation-In-Part of application Ser. No. 11/411,657, filed Apr. 25, 2006, now U.S. Pat. No. 7,417,548 B2, issued Aug. 26, 2008, entitled "ADJUSTING RFID WAVEFORM SHAPE IN VIEW OF SIGNAL FROM AN RFID TAG", commonly assigned herewith.

This application is a Continuation-In-Part of application Ser. No. 11/412,172, filed Apr. 25, 2006, now U.S. Pat. No. 7,391,329 B2, issued Jun. 24, 2008, entitled "PERFORMANCE DRIVEN ADJUSTMENT OF RFID WAVEFORM SHAPE", commonly assigned herewith.

BACKGROUND

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on. Accordingly, when a reader reads a tag code, data can be learned about the associated item that hosts the tag, and/or about the tag itself.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

RFID readers operating at the faster 900 MHz range can read the codes of RFID tags more quickly than was possible at the earlier slower frequencies. Such reading of many tags is also called inventorying the tags. A challenge with such inventorying is RF noise in the environment, which can make it difficult to read at least some of the tags. Plus, in every inventorying scenario, some tags can be inherently harder to read than others. When tags are not read, for whatever reason, operations are hurt.

BRIEF SUMMARY

The invention improves over the prior art.

Briefly, the present invention provides RFID reader systems, readers, components, software and methods for inventorying RFID tags. In some embodiments, a population of RFID tags begins being inventoried using a first set of communication parameters, and then continues using a second set of communication parameters.

The invention offers an advantage that some RFID tags can be inventoried faster, without missing tags that require a longer time to read.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which:

FIG. 5A is a diagram showing a population of tags that are accessible for reading.

FIG. 5B is a conceptual diagram for illustrating that different tags within the population of FIG. 5A require different minimum tag read sensitivities to be read.

FIG. 13A is the diagram of FIG. 5B, on which there is superimposed the tag read sensitivity of a reader resulting from communication parameters of a dynamic inventorying algorithm for accumulating tag data, according to embodiments.

FIG. 13B is a time diagram showing how much time is required for the algorithm of FIG. 13A to accumulate the tag data.

DETAILED DESCRIPTION

Figure 1:
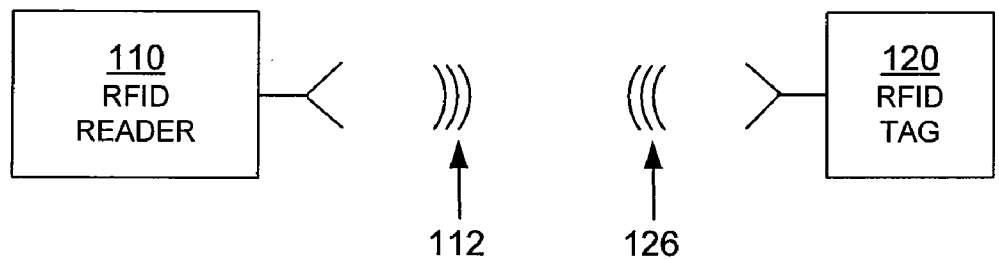
FIG. 1 is a block diagram of components of an RFID system according to embodiments.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment, an entirely firmware embodiment, or an embodiment combining aspects of the above. This description is, therefore, not to be taken in a limiting sense.

As has been mentioned, the present invention provides RFID reader systems, readers, components, software and methods for inventorying RFID tags. The invention is now described in more detail.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and demodulated from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e. having its own power source. Where tag 120 is a passive tag, it is powered from wave 112.

Figure 2:
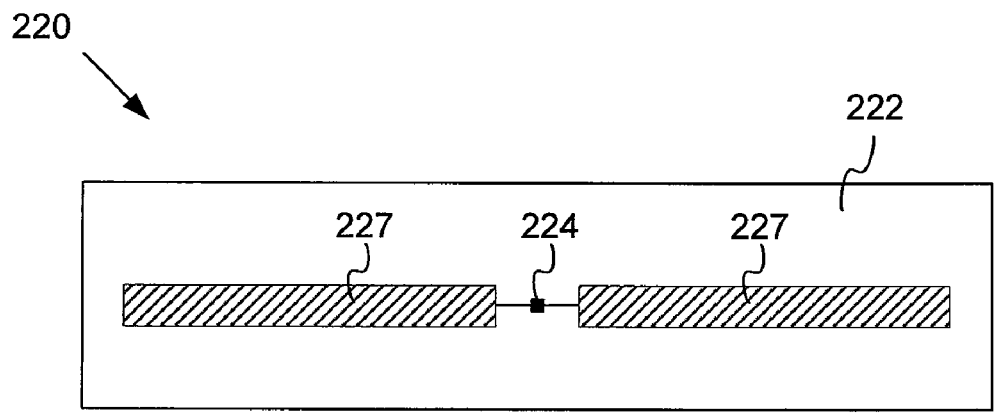
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
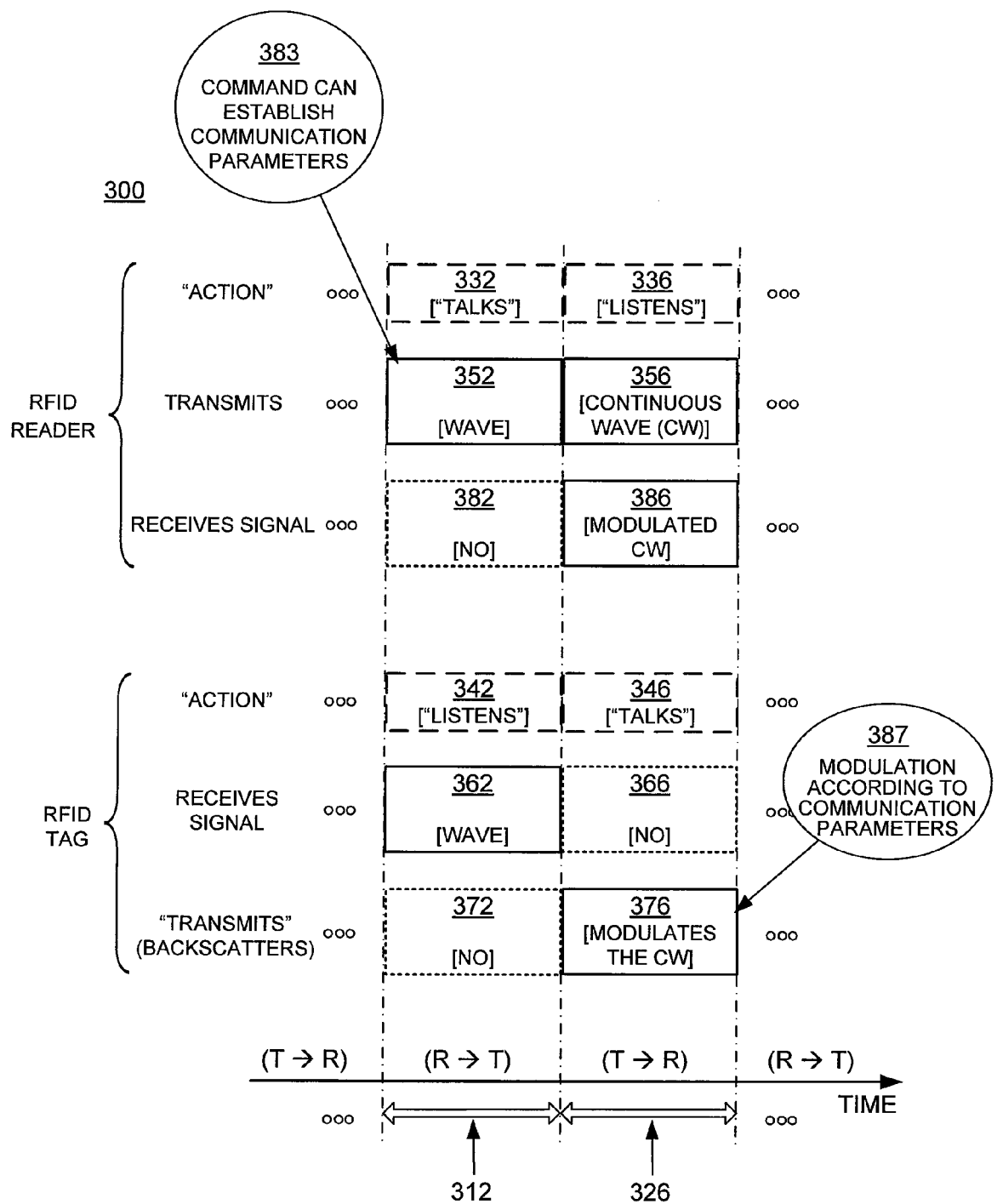
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326— here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are called protocols. A protocol is a specification that calls for specific manners of signaling between the reader and the tags.

One such protocol is called the Specification for RFID Air Interface—EPC™ Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO.

In addition, a protocol can be a variant of a stated specification such as the Gen2 Spec, for example including fewer or additional commands than the stated specification calls for, and so on. In such instances, additional commands are sometimes called custom commands. Other commands are in common between protocols, and between different versions of the protocol.

According to a comment 383, block 352 can include a command that establishes the communication parameters that are to be used. Such communication parameters can include, for example, what mode to use, a backscatter link frequency ("BLF" or just "LF"), and so on.

In some embodiments, commands from the reader include data encoded in terms of a first symbol for data-0 and a second symbol for data-1. In those cases, one of the communication parameters can be a duration of one of the first and the second symbols, or a ratio of their durations. In embodiments of the Gen2 Spec, these durations can be communicated by the Tari symbols.

In embodiments of various versions of the Gen2 Spec, a Miller parameter MP can also be specified. For example, the Miller Parameter MP can be defined consistently with how the Miller parameter M is defined in the Gen2 Spec v.1.1.0. In that version, MP, and also M, can support the values of 1, 2, 4, and 8.

According to a comment 387, the modulation of block 376 can be according to the communication parameters mentioned in comment 383. The communication parameters provide for backscattering the same reply. The inventors have found that tags behave differently, depending on these communication parameters, as described later in this document.

It was described above how reader 110 and tag 120 communicate in terms of time. In addition, communications between reader 110 and tag 120 may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

Reader 110 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 120 can respond with a backscatter that is modulated directly onto the frequency of the reader's emitted CW, also called baseband backscatter. Alternatively, tag 120 can respond with a backscatter that is modulated onto a frequency, developed by tag 120, that is different from the reader's emitted CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

A number of jurisdictions require a reader to hop to a new channel on a regular basis. When a reader hops to a new channel it may encounter RF energy there that could interfere with communications.

Embodiments of the present disclosure can be useful in different RFID environments, for example, in the deployment of RFID readers in sparse- or dense-reader environments, in environments with networked and disconnected readers such as where a hand-held reader may enter the field of networked readers, in environments with mobile readers, or in environments with other interference sources. It will be understood that the present embodiments are not limited to operation in the above environments, but may provide improved operation in such environments.

Figure 4:
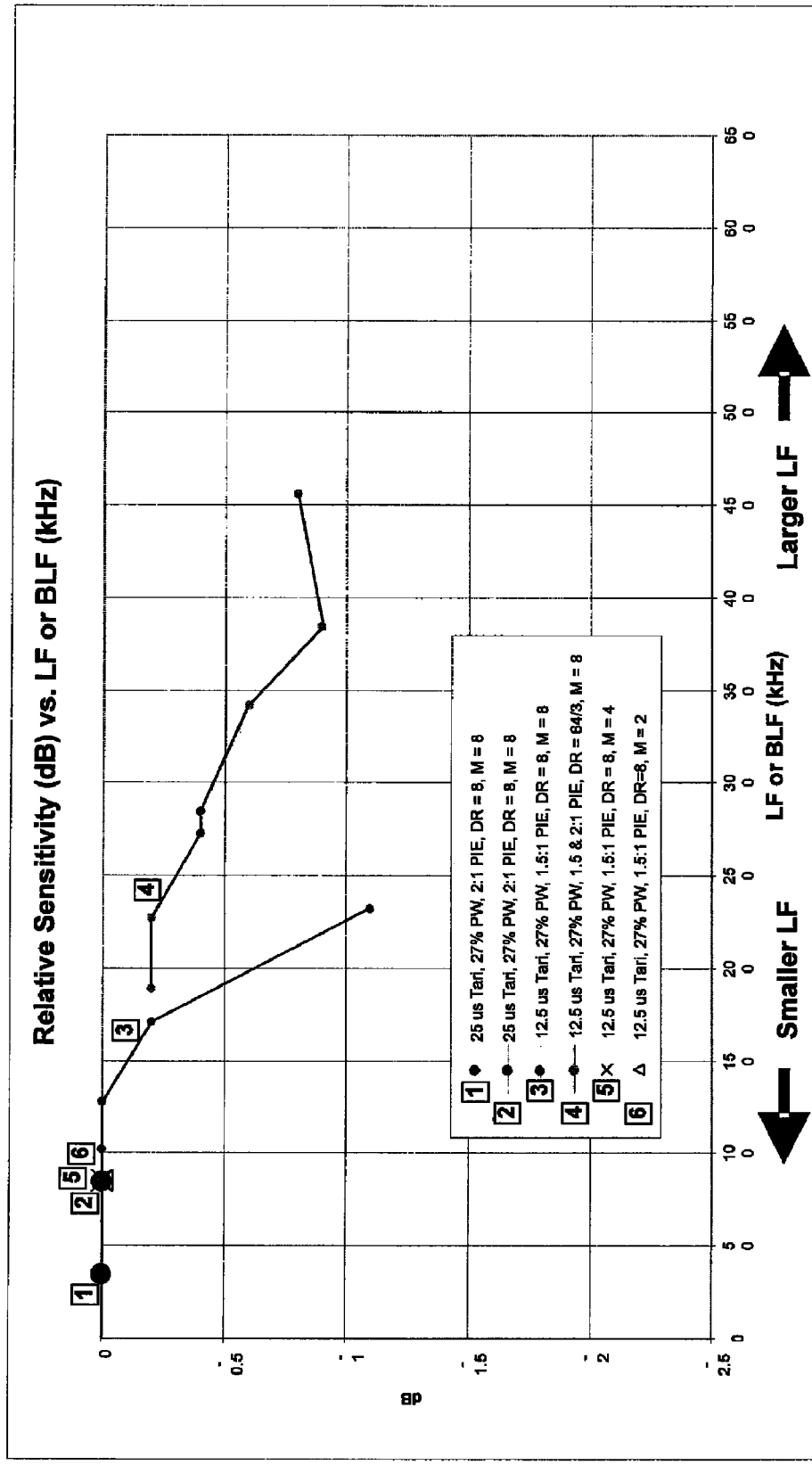
FIG. 4 is a diagram illustrating a plot of a power delivery test that the inventors performed, for a tag under different communication parameters.

FIG. 4 is a diagram 400, illustrating a plot of a power delivery test that the inventors performed, for a tag under different communication parameters. Six tested conditions are shown. From diagram 400, it can be inferred that sensitivity in reading the tag is different, under the different communication parameters. The reason seems to be that different amounts of power are required by the tag for operation at the different communication parameters. And, if the power delivered to the tag is too little, the tag may drop out, and not become inventoried.

FIG. 5A is a diagram showing a population 502 of tags that are accessible for reading, as would occur in a reading scenario. Population 502 includes NT tags, where NT is a number.

FIG. 5B is a conceptual diagram 500 for a whole population of tags, such as population 502. The NT individual tags in the population are designated separately in the horizontal axis. The vertical axis measures, for the tags as compared to each other, the minimum tag read sensitivity required to read the tag data.

The inventors further found that, when a whole population of tags is considered, and read in a reading scenario, its tags do not behave identically, even if they are made identically to each other. Instead, they seem to behave approximately as depicted in curve 511. So, tags in a first subgroup 531 of the population seem easier to read than those of a second subgroup 538, whether the reading scenario is the same or different. This differentiation may be affected by a number of factors, such as the exact reading scenario, where the readers are, a tag's place within the population, whether the population is being moved, and so on. It may also be related to power delivery to the tags, which was documented in FIG. 4. Further, this is not to say that it is always the same tags that are easier to read than the others, in any given reading scenario. The easier tags could be the same every time, or different ones at least some of the times. Curve 511 will be useful to contrast inventorying algorithms of the prior art with the benefits of embodiments of the present invention.

Figure 6A:
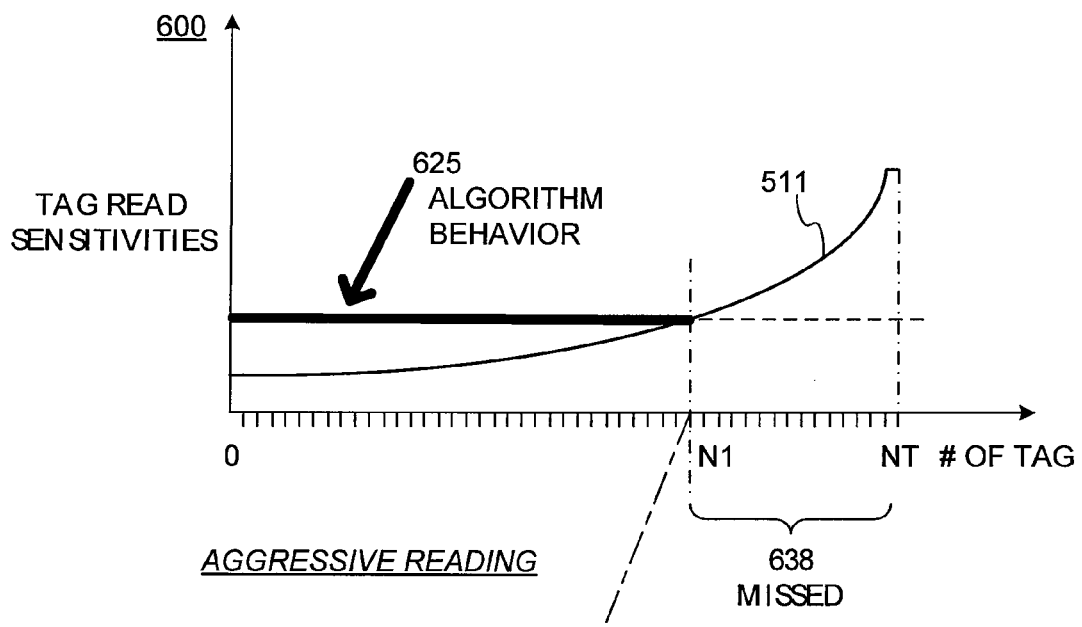
FIG. 6A is the diagram of FIG. 5B, on which there is superimposed the tag read sensitivity of a reader resulting from communication parameters of an aggressive prior art inventorying algorithm for accumulating tag data.

FIG. 6A is a diagram 600 for tag population 502, and also showing curve 511. In the prior art, reading tags in this population has been performed according to an aggressive inventorying algorithm, namely one whose communication parameters have been set for quick reading of each tag. These parameters define a certain tag read sensitivity, which is plotted as a horizontal line 625, for visualizing the algorithm behavior in correlation to curve 511.

As can be appreciated, a bold portion of line 625 is higher than curve 511 for a first subgroup of N1 of the NT tags, which will therefore be read. Moreover, remaining portion of line 625 is lower than curve 511 for the remaining subgroup 638 of tags in the population, which will thus be missed.

Figure 6B:
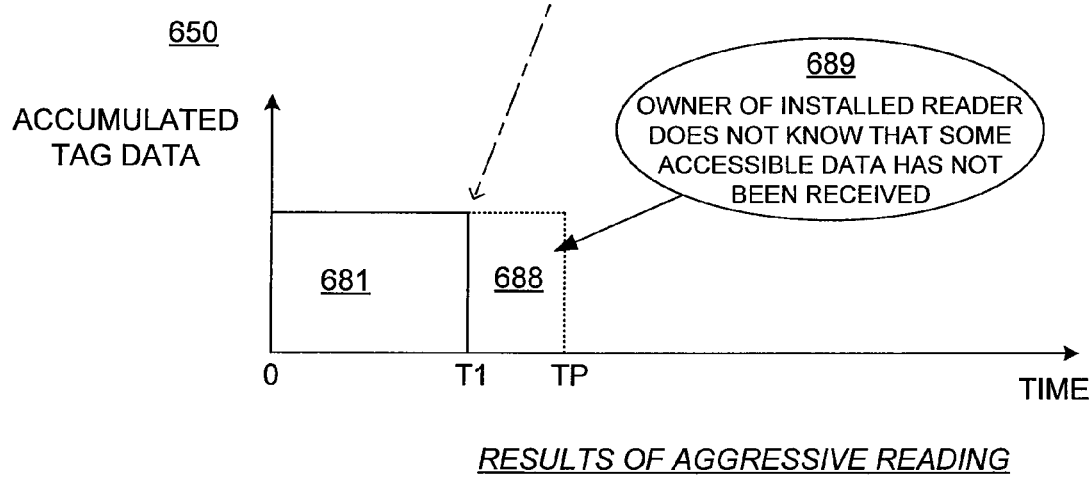
FIG. 6B is a time diagram showing how much time is required for the algorithm of FIG. 6A to accumulate the tag data.

FIG. 6B is a time diagram 650, showing the tag data that is accumulated by the inventorying algorithm of FIG. 6A. That algorithm is aggressive, in that it reads many tags quickly. As such, it takes only a rather short time T1 to read data 681 from the first N1 tags. Data 688, however, from the tags in subgroup 638 that were missed, will not be received. And, according to a comment 689, the owner of the reader will not know that this otherwise accessible data 688 was missed.

Figure 7A:
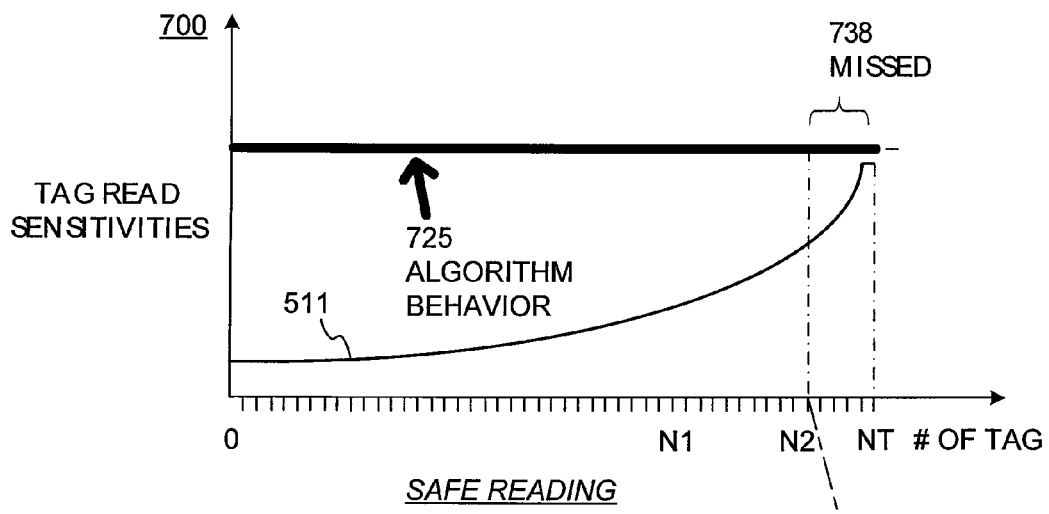
FIG. 7A is the diagram of FIG. 5B, on which there is superimposed the tag read sensitivity of a reader resulting from communication parameters of a safe prior art inventorying algorithm for accumulating tag data.

FIG. 7A is a diagram 700 for tag population 502, and also showing curve 511. In the prior art, reading tags in this population has also been performed according to a safe inventorying algorithm, namely one whose communication parameters have been set for slow reading of each tag. These parameters define a certain tag read sensitivity, which is plotted as a horizontal line 725, for visualizing the algorithm behavior in correlation to curve 511. As can be appreciated, a bold portion of line 725 is higher than curve 511 for all NT tags, which therefore could be read.

Figure 7B:
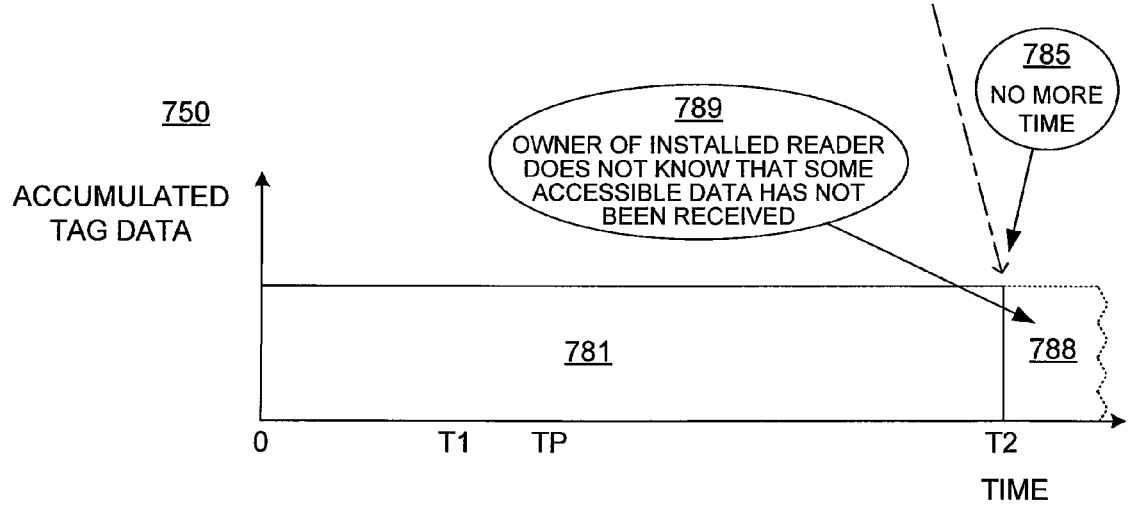
FIG. 7B is a time diagram showing how much time is required for the algorithm of FIG. 7A to accumulate the tag data.

FIG. 7B is a time diagram 750, showing the tag data that is accumulated by the safe inventorying algorithm of FIG. 7A. Since the tags are being read slowly, it takes a rather long time T2 to read data 781 from the first N2 tags. It will be observed that, while N2 is not that much larger than N1, T2 is much larger than T1. In other words, to read safely, every tag will be read much more slowly.

According to a comment 785, in some instances there is no more time after time T2. The tags may have been moved, for example. If that happens, then, returning to FIG. 7A, a remaining subgroup 738 of tags in the population will be missed. This can happen even though the algorithm was good enough to catch them, as evidenced from the remaining portion of line 725 still being higher than curve 511 for the remaining subgroup 738.

Referring back to FIG. 7B, data 788 from the tags in subgroup 738 will therefore not be received. And, according to a comment 789, the owner of the reader will not know that this otherwise accessible data 788 was missed.

Figure 8:
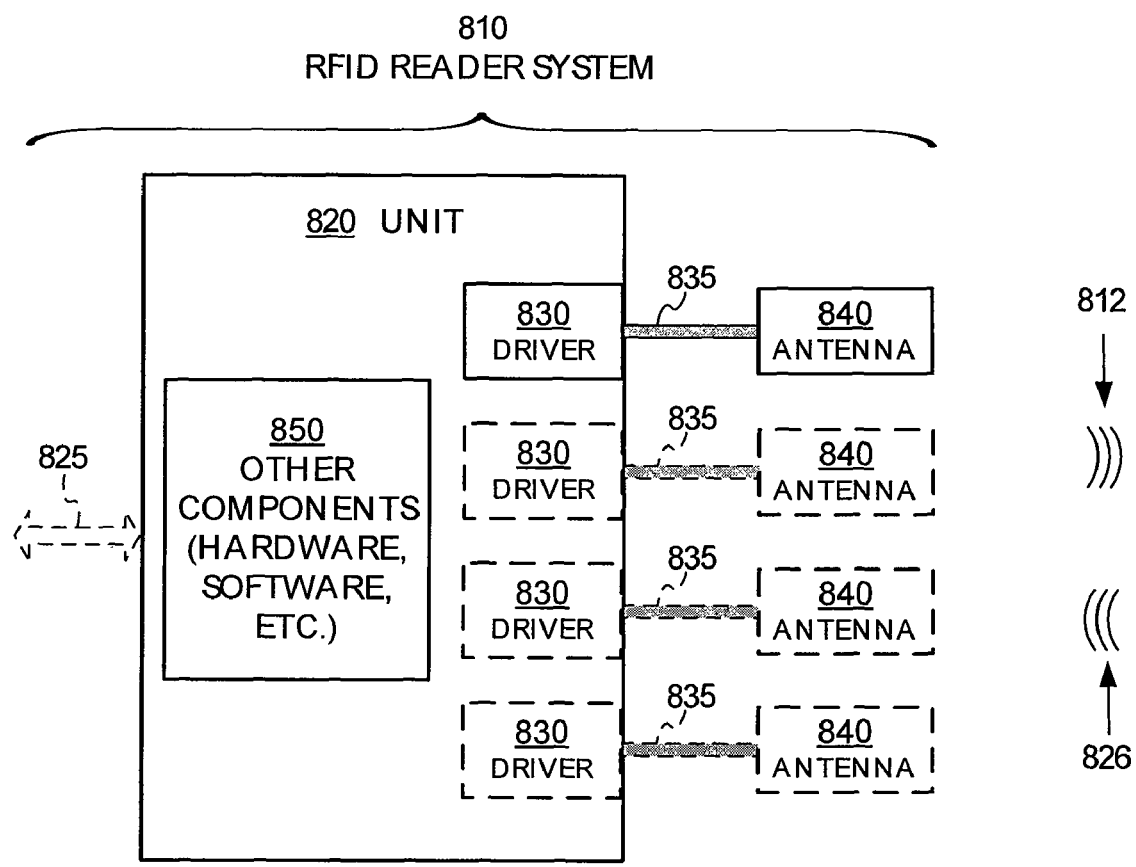
FIG. 8 is a block diagram showing a detail of an RFID reader system, such as the one shown in FIG. 1.

FIG. 8 is a block diagram showing a detail of an RFID reader system 810, which can be the same as reader 110 shown in FIG. 1. A unit 820 is also known as a box 820, and has at least one antenna driver 830. In some embodiments it has four drivers 830. For each driver 830 there is an output device for a connector. The output device is typically a coaxial cable plug. Accordingly connectors 835 can be attached to the output devices of the provided respective drivers 830, and then connectors 835 can be attached to respective antennas 840.

A driver 830 can send to its respective antenna 840 a driving signal that is in the RF range, which is why connector 835 is typically but not necessarily a coaxial cable. The driving signal causes the antenna 840 to transmit an RF wave 812, which is analogous to RF wave 112 of FIG. 1. In addition, RF wave 826 can be backscattered from the RFID tags, analogous to RF wave 126 of FIG. 1. Backscattered RF wave 826 then ultimately becomes a signal sensed by unit 820.

Unit 820 also has other components 850, such as hardware and/or software and/or firmware, which may be described in more detail later in this document. Components 850 control drivers 830, and as such cause RF wave 812 to be transmitted, and the sensed backscattered RF wave 826 to be interpreted. Optionally and preferably there is a communication link 825 to other equipment, such as computers and the like, for remote operation of system 810.

Figure 9:
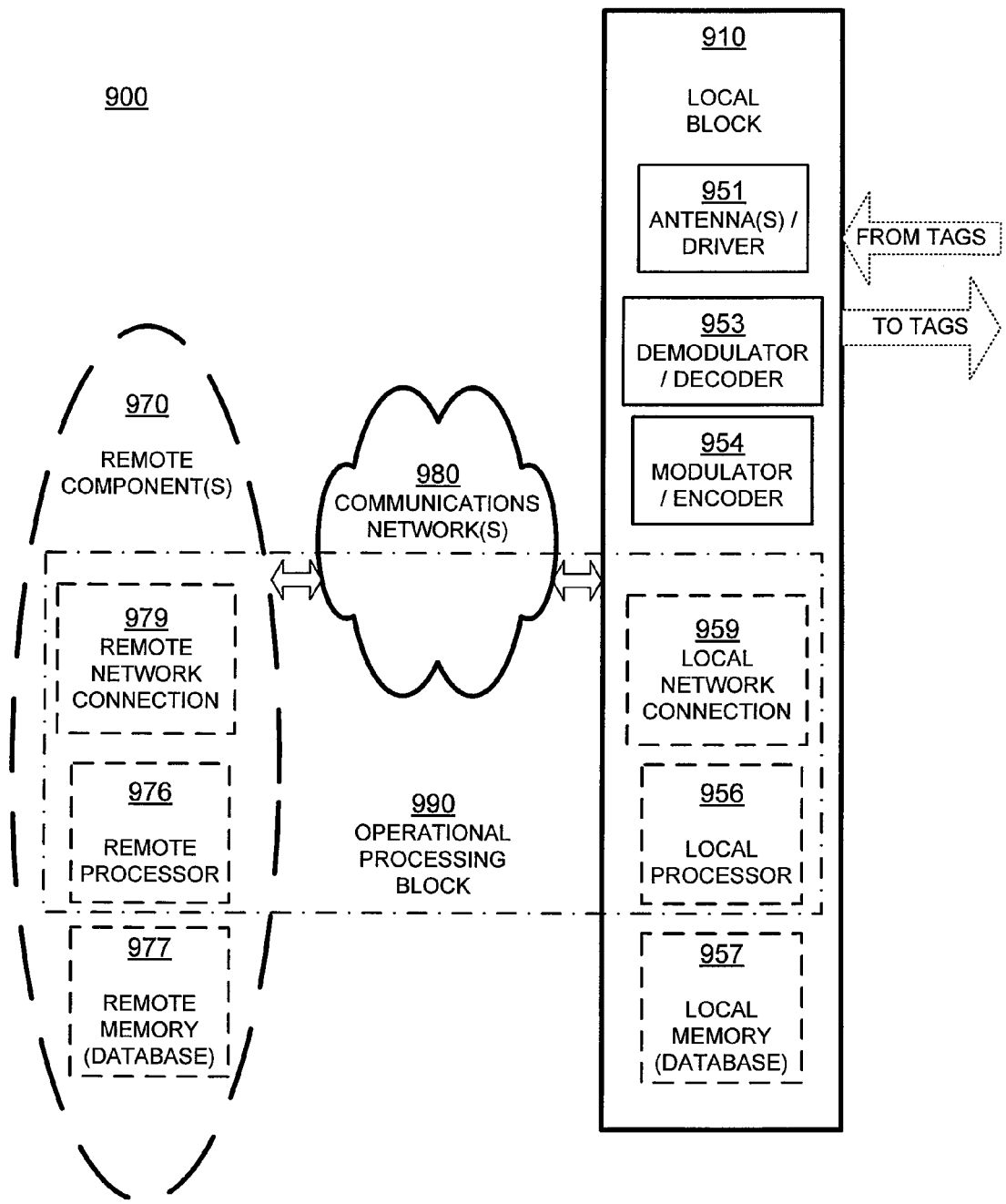
FIG. 9 is a block diagram of a whole RFID reader system according to embodiments.

FIG. 9 is a block diagram of a whole RFID reader system 900 according to embodiments. System 900 includes a local block 910, and optionally remote components 970. Local block 910 and remote components 970 can be implemented in any number of ways. It will be recognized that reader 110 of FIG. 1 is the same as local block 910, if remote components 970 are not provided. Alternately, reader 110 can be implemented instead by system 900, of which only the local block 910 is shown in FIG. 1. Plus, local block 910 can be unit 820 of FIG. 8.

Local block 910 is responsible for communicating with the tags. Local block 910 includes a block 951 of an antenna and a driver of the antenna for communicating with the tags. Some readers, like that shown in local block 910, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 953 demodulates and decodes backscattered waves received from the tags via antenna block 951. Modulator/encoder block 954 encodes and modulates an RF wave that is to be transmitted to the tags via antenna block 951.

Local block 910 additionally includes an optional local processor 956. Processor 956 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 953, the encoding function in block 954, or both, may be performed instead by processor 956.

Local block 910 additionally includes an optional local memory 957. Memory 957 may be implemented in any number of ways known in the art. Such ways include, by way of examples and not of limitation, nonvolatile memories (NVM), read-only memories (ROM), random access memories (RAM), any combination of one or more of these, and so on. Memory 957, if provided, can include programs for processor 956 to run, if provided.

In some embodiments, memory 957 stores data read from tags, or data to be written to tags, such as Electronic Product Codes (EPCs), Tag Identifiers (TIDs) and other data. Memory 957 can also include reference data that is to be compared to the EPC codes, instructions and/or rules for how to encode commands for the tags, modes for controlling antenna 951, and so on. In some of these embodiments, local memory 957 is provided as a database.

Some components of local block 910 typically treat the data as analog, such as the antenna/driver block 951. Other components such as memory 957 typically treat the data as digital. At some point there is a conversion between analog and digital. Based on where this conversion occurs, a whole reader may be characterized as "analog" or "digital", but most readers contain a mix of analog and digital functionality.

If remote components 970 are indeed provided, they are coupled to local block 910 via an electronic communications network 980. Network 980 can be a Local Area Network (LAN), a Metropolitan Area Network (MAN), a Wide Area Network (WAN), a network of networks such as the interne, or a mere local communication link, such as a USB, PCI, and so on. In turn, local block 910 then includes a local network connection 959 for communicating with network 980.

There can be one or more remote component(s) 970. If more than one, they can be located at the same location, or in different locations. They can access each other and local block 910 via network 980, or via other similar networks, and so on. Accordingly, remote component(s) 970 can use respective remote network connections. Only one such remote network connection 979 is shown, which is similar to local network connection 959, etc.

Remote component(s) 970 can also include a remote processor 976. Processor 976 can be made in any way known in the art, such as was described with reference to local processor 956.

Remote component(s) 970 can also include a remote memory 977. Memory 977 can be made in any way known in the art, such as was described with reference to local memory 957. Memory 977 may include a local database, and a different database of a Standards Organization, such as one that can reference EPCs.

Of the above-described elements, it is advantageous to consider a combination of these components, designated as operational processing block 990. Block 990 includes those that are provided of the following: local processor 956, remote processor 976, local network connection 959, remote network connection 979, and by extension an applicable portion of network 980 that links connection 959 with connection 979. The portion can be dynamically changeable, etc. In addition, block 990 can receive and decode RF waves received via antenna 951, and cause antenna 951 to transmit RF waves according to what it has processed.

Block 990 includes either local processor 956, or remote processor 976, or both. If both are provided, remote processor 976 can be made such that it operates in a way complementary with that of local processor 956. In fact, the two can cooperate. It will be appreciated that block 990, as defined this way, is in communication with both local memory 957 and remote memory 977, if both are present.

Accordingly, block 990 is location agnostic, in that its functions can be implemented either by local processor 956, or by remote processor 976, or by a combination of both. Some of these functions are preferably implemented by local processor 956, and some by remote processor 976. Block 990 accesses local memory 957, or remote memory 977, or both for storing and/or retrieving data.

Reader system 900 operates by block 990 generating communications for RFID tags. These communications are ultimately transmitted by antenna block 951, with modulator/encoder block 954 encoding and modulating the information on an RF wave. Then data is received from the tags via antenna block 951, demodulated and decoded by demodulator/decoder block 953, and processed by processing block 990.

The invention also includes methods. Some are methods of operation of an RFID reader or RFID reader system. Others are methods for controlling an RFID reader or RFID reader system.

These methods can be implemented in any number of ways, including the structures described in this document. One such way is by machine operations, of devices of the type described in this document.

Another optional way is for one or more of the individual operations of the methods to be performed in conjunction with one or more human operators performing some of them. These human operators need not be collocated with each other, but each can be only with a machine that performs a portion of the program.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described.

Figure 10:
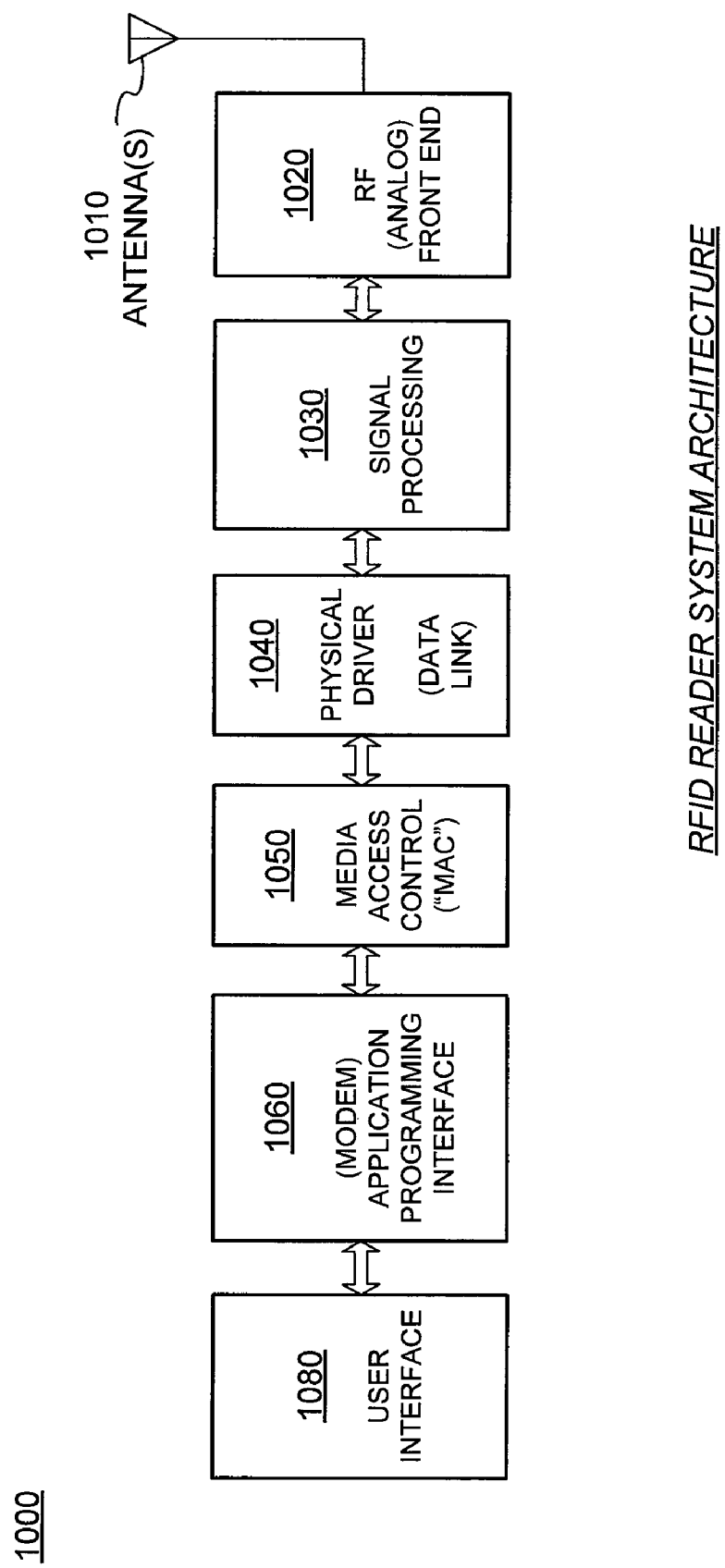
FIG. 10 is a block diagram illustrating an overall architecture of an RFID reader system according to embodiments.

FIG. 10 is a block diagram illustrating an overall architecture of an RFID reader system 1000 according to embodiments. It will be appreciated that system 1000 is considered subdivided into modules or components. Each of these modules may be implemented by itself, or in combination with others. It will be recognized that some aspects are parallel with those of FIG. 9. In addition, some of them may be present more than once.

RFID reader system 1000 includes one or more antennas 1010, and an RF Front End 1020, for interfacing with antenna(s) 1010. These can be made as described above. In addition, Front End 1020 typically includes analog components.

System 1000 also includes a Signal Processing module 1030. In this embodiment, module 1030 exchanges waveforms with Front End 1020, such as I and Q waveform pairs. In some embodiments, signal processing module 1030 is implemented by itself in an FPGA.

System 1000 also includes a Physical Driver module 1040, which is also known as Data Link. In this embodiment, module 1040 exchanges bits with module 1030. Data Link 1040 can be the stage associated with framing of data. In one embodiment, module 1040 is implemented by a Digital Signal Processor.

System 1000 additionally includes a Media Access Control module 1050, which is also known as MAC layer. In this embodiment, module 1050 exchanges packets of bits with module 1040. MAC layer 1050 can be the stage for making decisions for sharing the medium of wireless communication, which in this case is the air interface. Sharing can be between reader system 1000 and tags, or between system 1000 with another reader, or between tags, or a combination. In one embodiment, module 1050 is implemented by a Digital Signal Processor.

System 1000 moreover includes an Application Programming Interface module 1060, which is also known as API, Modem API, and MAPI. In some embodiments, module 1060 is itself an interface for a user.

All of these functionalities can be supported by one or more processors. One of these processors can be considered a host processor. Such a processor would, for example, exchange signals with MAC layer 1050 via module 1060. In some embodiments, the processor can include applications for system 1000. In some embodiments, the processor is not considered as a separate module, but one that includes some of the above-mentioned modules of system 1000.

A user interface 1080 may be coupled to API 1060. User interface 1080 can be manual, automatic, or both. It can be supported by a separate processor than the above mentioned processor, or implemented on it.

It will be observed that the modules of system 1000 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 1010 as signals, which are in turn processed successively by the various modules in the chain. Processing can terminate in any one of the modules. In a transmitting mode, initiation can be in any one of these modules. Ultimately, signals are transmitted internally, for antenna(s) 1010 to transmit as wireless waves.

The architecture of system 1000 is presented for purposes of explanation, and not of limitation. Its particular subdivision into modules need not be followed for creating embodiments according to the invention. Furthermore, the features of the invention can be performed either within a single one of the modules, or by a combination of them.

An economy is achieved in the present document in that a single set of flowcharts is used to describe methods in and of themselves, along with operations of hardware and/or software and/or firmware. This is regardless of how each element is implemented.

Figure 11:
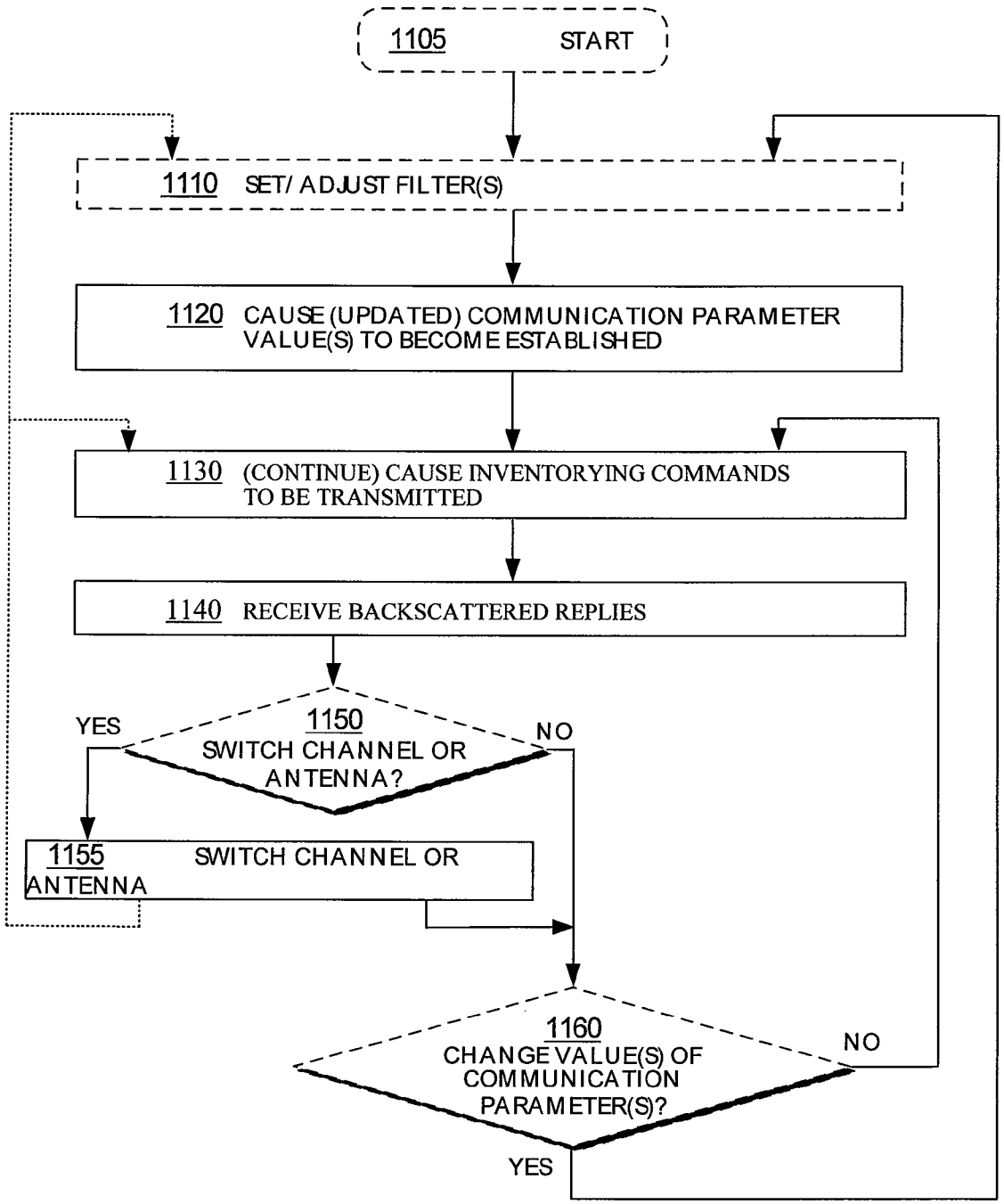
FIG. 11 is a flowchart illustrating methods according to embodiments.

FIG. 11 is flowchart 1100 illustrating methods according to embodiments. The methods of flowchart 1100 is for inventorying of a population of RFID tags, and may be practiced by different embodiments, including but not limited to RFID reader systems, readers, components and software that would cause this inventorying.

Flowchart 1100 is described in terms of distinct operations, which may occur in different orders than is shown. A Start operation 1105 is designated as mostly a convenient starting point for this description. But flowchart 1100 can actually start at any one of these operations, and indeed it will be recognized that execution could cycle along these operations more than once.

At operation 1110, one or more receive filters are optionally set or adjusted for the reader. This operation preferably takes place when communication parameters have been changed such that a different tag data rate has been defined. As will be recognized, as values for the communication parameters are updated, the tag data rate may change or remain the same.

The receive filter can be made in any way known in the art. The overall receive filters can include analog filters, which are a first line of defense against noise, and digital filters, to further reject noise. The latter can be programmable for further refinement of operation.

The analog filters can include a Low Pass Filter, which removes high-frequency noise. It can be used with very slow tag data rates, to accommodate maximum tag sensitivity.

Additional analog filters are now described, in terms of diagrams where amplitude is plotted over frequency.

Figure 12:
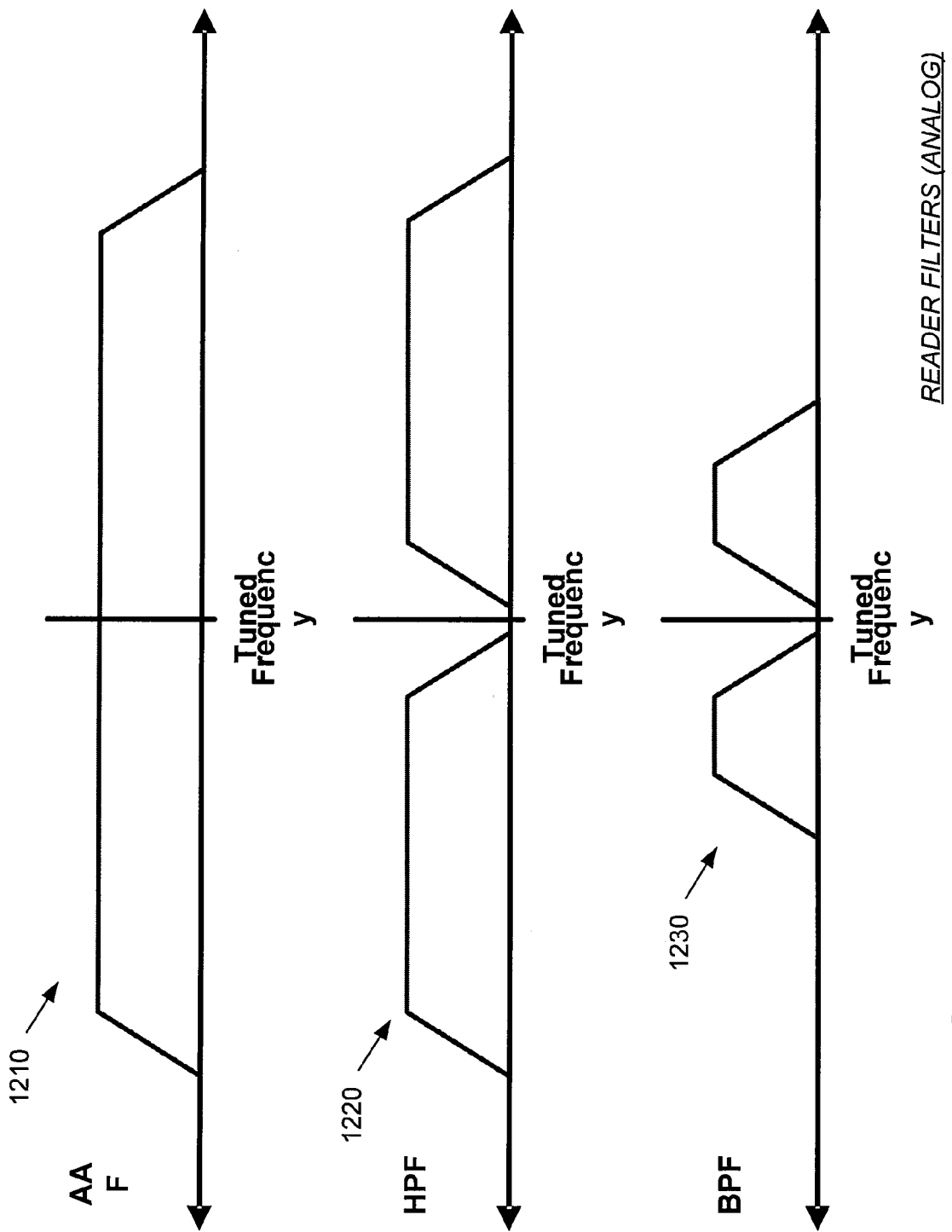
FIG. 12 is a diagram illustrating frequency responses of receive analog filters set and adjusted by embodiments of operations of FIG. 11.

Referring briefly to FIG. 12, a frequency response 1210 of a sample Anti-Aliasing Filter (AAF) is plotted. This can be a wide filter, going up to about 1 MHz, and is intended to primarily limit the noise going into an Analog to Digital Converter. When applied to communication using the Gen2 Spec, it may work for all modes.

In addition, a frequency response 1220 of a sample High Pass Filter (HPF) is plotted. This can remove low frequency noise. When applied to communication using the Gen2 Spec, it can be used with Miller backscattering, with the Miller Parameter having values of MP=2, 4 or 8, but not baseband (FM0) or MP=1.

In addition, a frequency response 1230 of a sample Band Pass Filter (BPF) is plotted. This can help remove high-frequency noise and low-frequency noise. Plus, it can be used for frequencies consistent with those called for in the Gen2 Spec v.1.1.0, and using a Miller parameter MP, consistent with how M is defined in the Gen2 Spec v.1.1.0. In those cases, the BPF can be designed to optimize a Signal to Noise Ratio best for the value of MP=4, less well for a value of MP=8, even less or not at all for a value of MP=2 or MP=1. In some embodiments, it might not work at all for MP=2 or MP=1.

Returning to FIG. 11, at next operation 1120, values are caused to be established for communication parameters that will be used for inventorying. Many communication parameters are possible. For example, one of the communication parameters can be the above-mentioned Miller parameter MP. If communication is according to Gen2 Spec v.1.1.0, then the Miller parameter MP coincides with the Miller parameter M defined in that version.

Another possible communication parameter whose value is thus established can be the backscatter link frequency, designated as LF or BLF. In communication protocols that are consistent with the Gen2 Spec v.1.1.0 in that regard, the BLF can assume values between 40 kHz and 640 kHz.

Another communication parameter whose value can thus be established can be a true/false value of whether or not a pilot tone will also be backscattered. For example, one of the communication parameters can include a pilot tone indication, which indicates whether or not one of the replies should be preceded by a pilot tone. In those cases, the true/false value can be the pilot tone indication. Accordingly, one of the backscattered replies can be preceded by a pilot tone or not, in accordance with the pilot tone indication. In some protocols, the true/false value is a parameter TRextend, which can be defined consistently with the TRext of the Gen2 Spec v.1.1.0 in that regard.

One more possible communication parameter whose value is thus established can relate to the duration of symbols. For example, the inventorying commands from the reader can be encoded in terms of at least a first symbol for data-0, and a second symbol for data-1. So, in some embodiments, one of the communication parameters can indicate the duration of the first or the second symbol. In some embodiments, one of the communication parameters can indicate a ratio of durations between the first and the second symbols.

These communication parameters can be established in any number of ways. In many embodiments, they are communicated by the reader to the tag according to the applicable protocol. For example, they can be either in a preamble, or in an explicit command. These communication parameters are used by either the commands ultimately transmitted by a reader, as will be explained with reference to operation 1130, or by the replies backscattered by the tags, as will be explained with reference to operation 1140, or both.

One time that operation 1120 is executed can be considered a first time, where a first set of such values becomes established for these communication parameters. Another, subsequent such time that operation 1120 is executed can be considered a second time, where a second or updated set of such values becomes established.

At next operation 1130, inventorying commands are caused to be transmitted for inventorying the RFID tags. The commands are ultimately transmitted by a reader system, and can be as per the applicable protocol. One time that operation 1130 is executed can be considered a first time, causing first such inventorying commands to be transmitted. Another, subsequent such time that operation 1130 is executed can be considered a second time, causing second such inventorying commands to be transmitted.

At next operation 1140, responsive to the inventorying commands of the previous operation, replies are received, which are backscattered from some of the RFID tags in the population. One time that operation 1140 is executed can be considered a first time, causing first such replies to be received. Another, subsequent such time that operation 1140 is executed can be considered a second time, causing second such replies to be received.

At optional next operation 1150, it is considered whether frequency channel or the antenna should be switched. As mentioned above, a reader may hop on to a new channel, as possibly required by regulations, and implemented by portions of its programmed algorithm. In addition, a reader might start using a different antenna, e.g. one of antennas 840 shown in FIG. 8, as implemented by portions of its programmed algorithm. If so, then at optional next operation 1155, a new channel is hopped on to, or a new antenna is transmitted out of.

Operation 1155 may be performed, or not. Then execution can continue, for example by transferring to operation 1110, or 1130, or next optional operation 1160, and so on. Plus, if operation 1150 is not performed, then execution can proceed to next optional operation 1160.

At optional next operation 1160 it is determined whether to change a value of one or more of the communication parameters that were established at operation 1120. The determination may be made in any number of ways, some of which are described later in this document. Plus, operation 1160 is optional, in that it need not be performed, strictly speaking. Changing the parameter value may be caused automatically, i.e. without requiring a determination, or not at all. If, at operation 1160, it is determined that no values are to change, then execution can return to operation 1130.

If, at operation 1160, the value of even one of these parameters is to change, then the whole set of applicable values can be considered that it is to change. In other words, the whole set is considered to be adjusted, even if most of its values will remain the same. Then execution can return to optional operation 1110, to maybe reset the filters, then to operation 1120 to cause the updated parameter values to become established, and then to operation 1130. Plus, the new values can be preset, or can be determined from attributes of the backscattered replies that were received at operation 1140.

Accordingly, in flowchart 1100, execution may loop around a number of times. Each next time, the same or different communication parameter values can be established per operation 1120, then inventorying commands may be transmitted per operation 1130, and replies received per operation 1140. Of those, either or both of the commands and the replies can take place using the latest communication parameter values.

In embodiments where execution loops to repeat operations 1120, 1130, 1140, the antenna may or may not have been switched for multiple repetitions. In other words, in some embodiments, there is transmission out of a single antenna, without having transmitted out of another. Moreover, the frequency channel may or may not have been switched. In other words, in some embodiments, there is transmission in a single channel, without having transmitted in another.

This principle can then be used for inventorying a population of RFID tags that exhibit the behavior of curve 511. In other words, tags can be read using different values for the communication parameters.

In some optional embodiments, with each next pass of flowchart 1100, one or more of the tags that have already been inventoried are not addressed again for reading. Preferably, but not necessarily, all of the tags that have already been inventoried are not addressed again for reading. Such embodiments are preferred if the time to read is limited, and each next pass is slower, due to the increased tag read sensitivity.

Preventing tags from being read again in the subsequent pass can be accomplished in any number of ways, with proper selection of commands. For example, the inventorying commands can be suitable for continuing inventorying at least some those of the RFID tags in the population that have not replied yet, but not one or more or all of those that have. In some embodiments, this is accomplished while continuously powering the tags in the population, i.e. powering them from the first and the second inventorying commands, and causing them to not lose power during a transition between the first and the second inventorying commands.

In some embodiments, sessions are used for inventorying. For example, v.1.1.0 of the Gen2 Spec defines sessions S0, S1, S2 and S3. Embodiments can use sessions defined consistently with these sessions, even if a different version or a different protocol is being used. For example, the first inventorying commands can be transmitted while a current session has been established. The current session has been selected from one of available sessions S0, S1, S2 and S3, which are defined consistently with respective sessions S0, S1, S2 and S3 that are defined in the Gen2 Spec v.1.1.0. A certain RFID tag can include a current session flag for the current session. This session flag can be capable of having one of two states A and B, and the state can be flipped as the certain RFID tag becomes inventoried by the first inventorying commands. This defines the certain RFID tag to be in the first subgroup. Then the second inventorying commands can be transmitted without having caused the current session flag to be further changed from when it was thus flipped, during the subsequent transition between the first inventorying commands and the second inventorying commands. This way the certain tag of the first subgroup will become inventoried as part of the first subgroup, and will be kept from participating also in the second subgroup.

An algorithm according to FIG. 11 can result in improved performance for reading the tags. This is illustrated below.

FIG. 13A is a diagram 1300 for tag population 502. It shows the same quantities as FIG. 5B, plus it includes curve 511. It also shows a tag read sensitivity line 1325 of a reader, which could result by operations shown in FIG. 11. Tag read sensitivity line 1325 results from these communication parameters, which can change by operations shown in FIG. 11. As such, tag read sensitivity line 1325 helps visualize the algorithm behavior in correlation to curve 511. It has horizontal segments, each of which corresponds to reading tags under a single set of parameters, and one iteration of operations 1120, 1130, 1140 in flowchart 1100. Shifting to a different horizontal segment corresponds to adjusting the set of parameters, for repeating the iteration.

As will be appreciated, tag read sensitivity line 1325 can remain above curve 511 for all tags NT. As such, it is plotted in bold typeface, to be better understood in relation to the earlier-described horizontal lines 625 and 725.

FIG. 13B is a time diagram 1350, showing how much time is required for the algorithm of FIG. 13A to accumulate the tag data. The first N1 tags, which can be the first subgroup, are read by time T1 to yield data 1381. A second subgroup, for tags up to N2 in FIG. 13A, will be read at different parameters, and therefore more slowly, to yield data 1382 in FIG. 13B. Even though it takes longer per tag, it does not take as long because the already inventoried tags of the first subgroup are not participating in this embodiment. Similarly, a third subgroup, for tags up to NT in FIG. 13A, will be read at different parameters, and therefore more slowly, to yield data 1383 in FIG. 13B. Then, line 1325 can jump even higher, in an attempt to read more of the accessible tags. Even upon not finding any, it can jump again, and so on, until, per a comment 1332, there is confidence that it has not missed any tags that are otherwise accessible.

As such, reading according to the operations of FIG. 11 can be faster. Referring to FIG. 13B, according to comment 1389, all tag data 1381, 1382, 1383 has been received, which is better performance than is shown in FIG. 6B. In addition, they have been received faster than time T2, which is faster than for the algorithm of FIG. 7B, and sometimes critical if there is a problematic time constraint like one is shown in FIG. 7B.

Each one of sets 1381, 1382, 1383 can thus be accumulated as corresponding to a different horizontal segment of tag read sensitivity line 1325. Line 1325 is shown as having a total of five horizontal segments, each at increasing sensitivity. Of these, the first one reads up to tag N1, the second up to tag N2, and so on. Depending on the population, different numbers of segments will be needed before there is high confidence that the entire population has been read. In some instances, this confidence is attained after a horizontal segment of a high enough sensitivity returns no more tags.

In addition, the shown horizontal segments need not be implemented as shown in the example of FIG. 13A. For example, the first horizontal segment, reading up to tag N1, could be preceded by an earlier segment, which we shall call zeroth segment only to preserve the numbering sequence. Accordingly, commands can be sent with parameters corresponding to that segment, with or without receiving corresponding replies. Even if replies are received, then the first segment can be done, repeating or not the tags that already replied.

Each one of sets 1381, 1382, 1383 can be accumulated with a different iteration of FIG. 11. Attention is now drawn to transitions 1391, 1392, which are the points between iterations. These transitions 1391, 1392 can have different time durations.

Referring to FIG. 11, transitions 1391, 1392 of FIG. 13B can happen at operation 1160, or automatically, etc. As shown in the example of FIG. 13A, 13B, it is suggested that these transitions 1391, 1392 occur only when all tags of a subgroup that could be read have indeed been read; and where, if line 1325 were to continue extending horizontally, it would move under curve 511. Indeed, transitions 1391, 1392 can occur upon exhausting the tags that can be read at the current sensitivity parameters, but that is not necessary. In some embodiments, these transitions 1391, 1392 can occur prior to so exhausting, at operation 1160 of FIG. 11.

Examples are now described for performing optional operation 1160. In all examples, a determination is made whether or not to change parameters, and execution proceeds as shown in flowchart 1100, in accordance with the determination.

Figure 14:
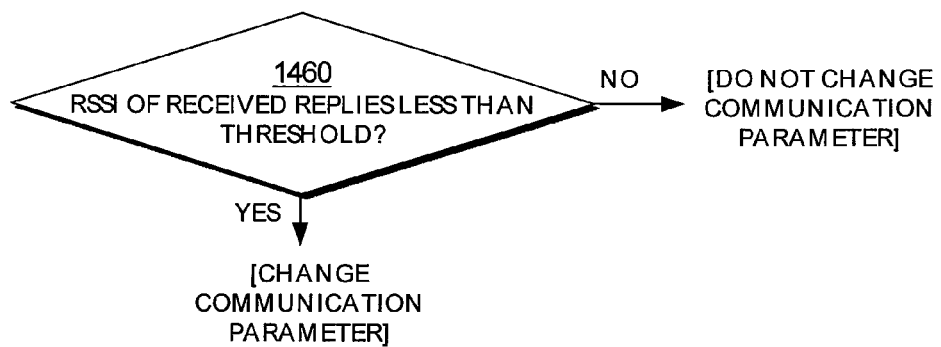
FIG. 14 is a flowchart segment for illustrating performing an operation of the method of FIG. 11 according to an embodiment.

FIG. 14 is a flowchart segment for illustrating performing operation 1160 according to an embodiment. At operation 1460, a Received Signal Strength Indicator (RSSI) is determined from the first replies, referring to how much power the tags are replying with. In this embodiment, the second set of values can be caused to be established if the RSSI is below a threshold. Such would be, for example, if there is a concern about the tag reply having too little power compared to RF noise. The threshold can be further adjusted, and so on.

Figure 15:
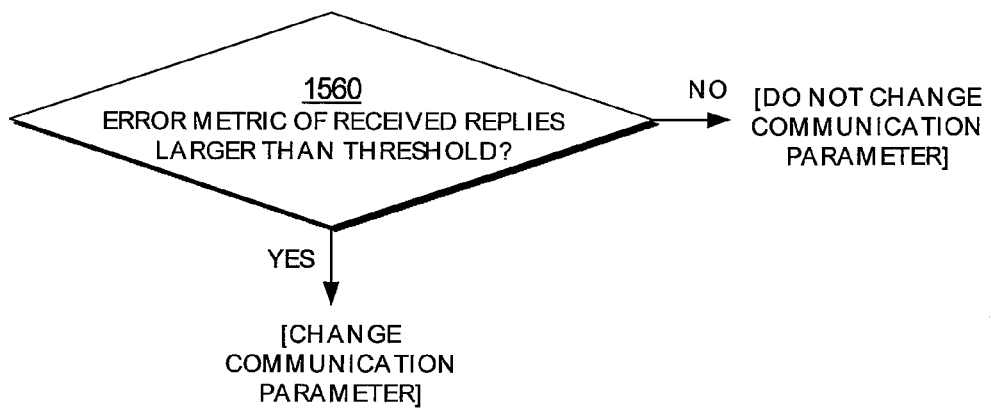
FIG. 15 is a flowchart segment for illustrating performing an operation of the method of FIG. 11 according to another embodiment.

FIG. 15 is a flowchart segment for illustrating performing operation 1160 according to another embodiment. At operation 1560, an error metric is determined about the first replies. The error metric can be a measure of how many errors are being detected, e.g. over time, or over each reply, and so on. Some such error metrics can be a bit error rate, a packet error rate, and so on. In this embodiment, the second set of values can be caused to be established if the error metric exceeds a threshold. Such would be an indication that tag reading conditions are unfavorable, for example due to interference or other factors specific to the reading scenario.

As already mentioned, the second set of values can be caused to be established before detecting that there are no more first replies. In fact, in some embodiments, it can be caused to be established while first replies would still be expected.

Figure 16:
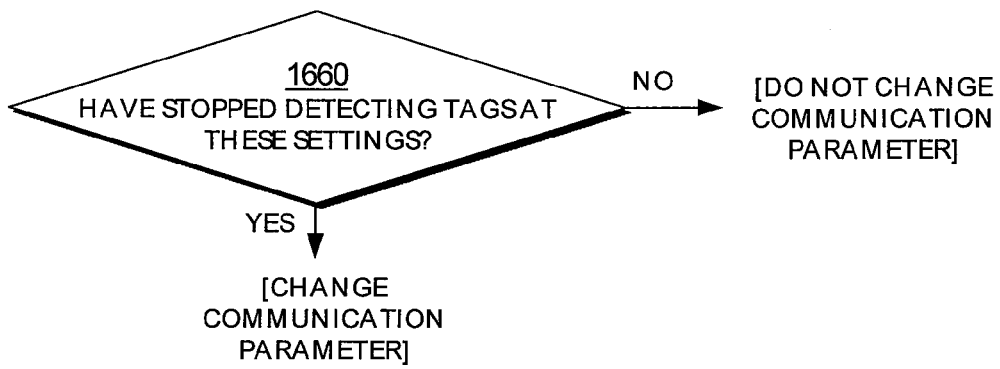
FIG. 16 is a flowchart segment for illustrating performing an operation of the method of FIG. 11 according to an additional embodiment.

FIG. 16 is a flowchart segment for illustrating performing operation 1160 according to an additional embodiment. At operation 1660, it is determined whether first replies are still being detected, or are no longer being detected. In these embodiments, the second set of values can be caused to be established responsive to detecting no more such first replies.

Figure 17:
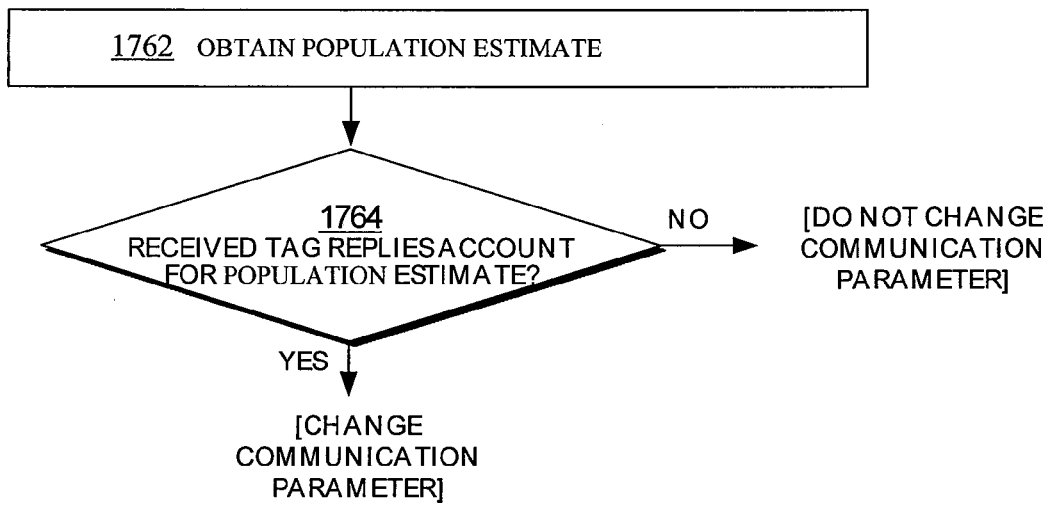
FIG. 17 is a flowchart segment for illustrating performing an operation of the method of FIG. 11 according to a further embodiment.

FIG. 17 is a flowchart segment 1760 for illustrating performing operation 1160 according to a further embodiment. At operation 1762, an estimate is obtained for the number of the RFID tags in the population. The estimate can be obtained in any number of ways. For example, it can be obtained as an input from a user. Or it can be inferred from statistics of inventorying, such as a parameter Q specified consistently with how it is defined in the Gen2 Spec v.1.1.0. A good value of Q can be arrived at by numbers of slots that are empty, etc.

At next operation 1764, it is determined whether or not the first replies do not account for the entire population estimate. In these embodiments, the second set of values can be caused to be established responsive to determining that the first replies do not account for the entire population estimate.

Figure 18:
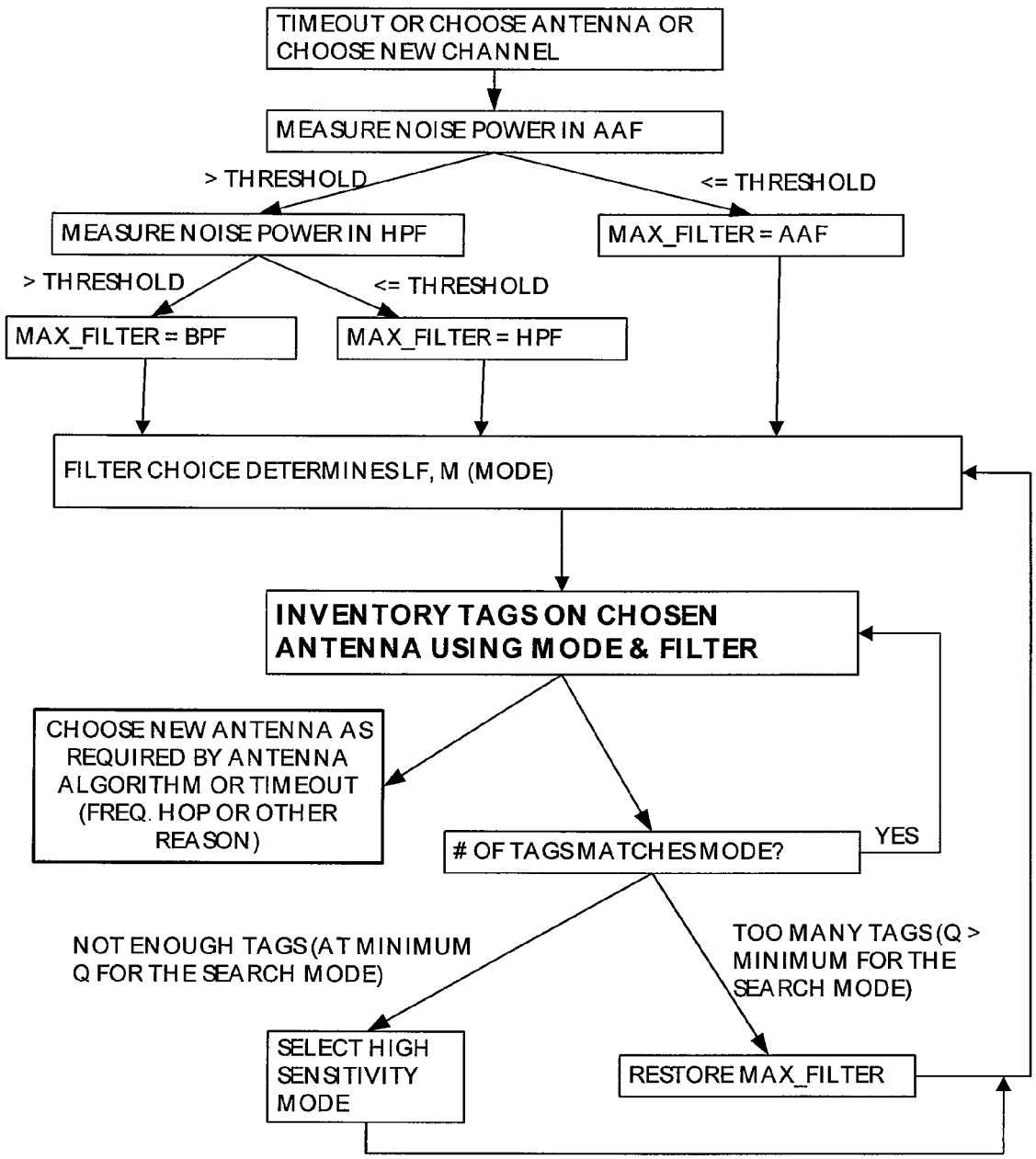
FIG. 18 is a flowchart illustrating a detailed embodiment for one of the methods of FIG. 11.
Figure 19:
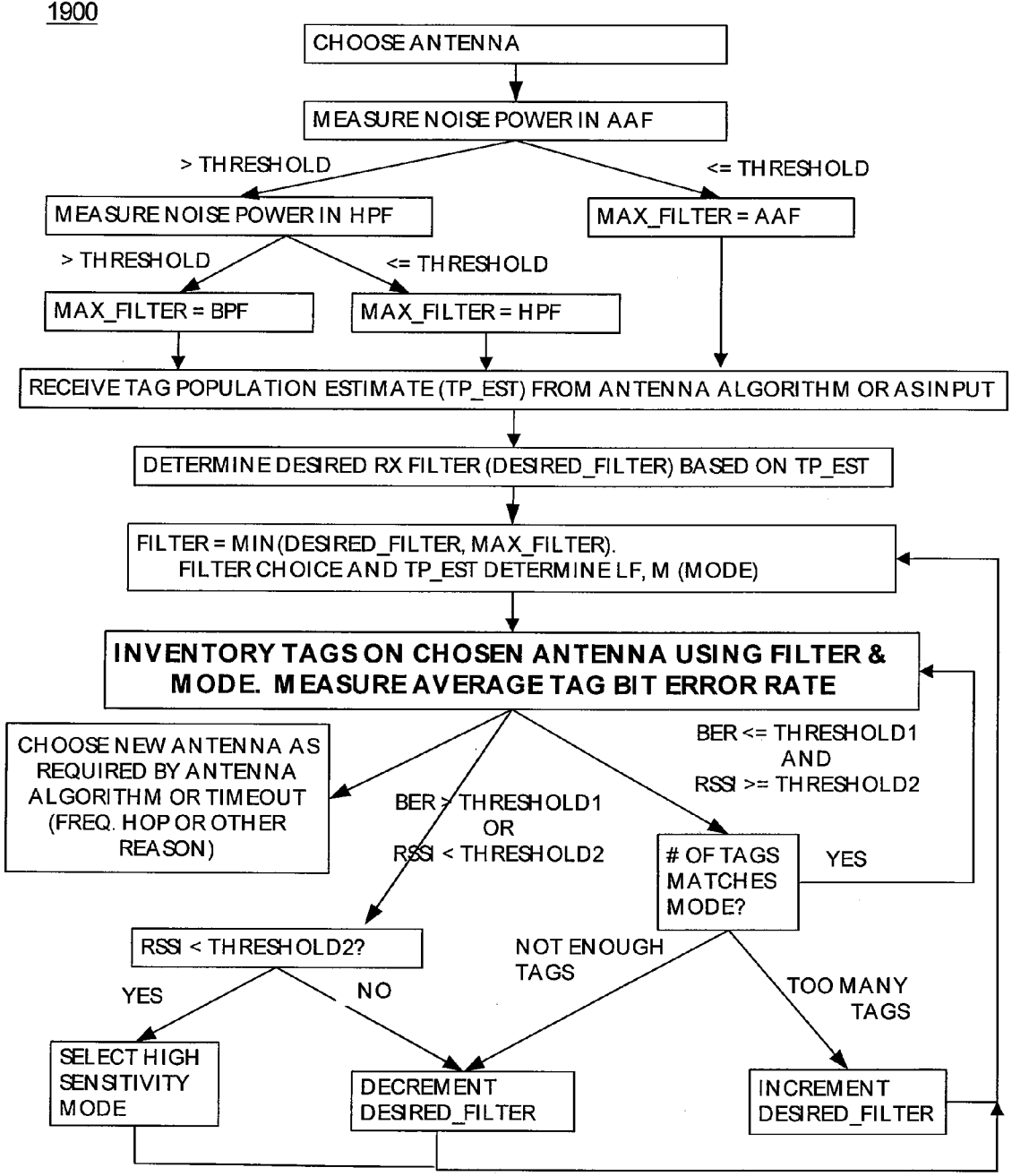
FIG. 19 is a flowchart illustrating a detailed embodiment for one of the methods of FIG. 11.

FIG. 11 was drawn so as to best illustrate embodiments of the present invention. In implementation, algorithms and methods can be more complex, as they include aspects that are not of the present invention. FIG. 18 is a flowchart 1800 illustrating a detailed embodiment for one of the methods of FIG. 11. FIG. 19 is a flowchart 1900 illustrating another detailed embodiment for one of the methods of FIG. 11. In each case, the operation is as per the content of the boxes.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. An operational processing block for a Radio Frequency Identification (RFID) reader to inventory a population of RFID tags, comprising: a component for:

causing to be established a first set of values for communication parameters;

causing to be transmitted first inventorying commands for inventorying the RFID tags, and receiving, responsive to the first inventorying commands, first replies that are backscattered from a first subgroup of RFID tags in the population, at least one of the first inventorying commands and the first replies using communication parameters having the first set of values;

then causing to be established a second set of values for the communication parameters, different from the first set of values; and causing to be transmitted second inventorying commands that are suitable for continuing inventorying those of the RFID tags in the population that are not in the first subgroup, but not suitable for continuing inventorying at least one of those that is in the first subgroup, and receiving, responsive to the second inventorying commands, second replies that are backscattered from a second subgroup of RFID tags in the population that does not include the first subgroup, at least one of the second inventorying commands and the second replies using communication parameters having the second set of values, in which at least one tag of the first subgroup and at least one tag of the second subgroup are powered from both the first and the second inventorying commands, and remain continuously powered during a transition between the first and the second inventorying commands.

2. The operational processing block of claim 1, in which a receive filter is adjusted to accommodate receiving the first replies, and the receive filter is then further adjusted to accommodate the second replies.

3. The operational processing block of claim 2, in which the first replies are received at a first tag data rate, and the second replies are received at a second tag data rate different from the first tag data rate.

4. The operational processing block of claim 2, in which the first commands are transmitted at frequencies consistent with those called for in the Gen2 Spec v.1.1.0, one of the communication parameters is a Miller Parameter MP defined consistently with how the Miller parameter M is defined in the Gen2 Spec v.1.1.0. the Miller Parameter MP capable of assuming a value of one of 1, 2, 4, and 8, and the receive filter includes a Band Pass Filter that optimizes a Signal to Noise Ratio best for the value of MP=4, less well for a value of MP=8, even less or not at all for a value of MP=2 or MP=1.

5. The operational processing block of claim 1, in which one of the communication parameters is a Miller parameter MP defined consistently with how the Miller parameter is defined in the Gen2 Spec v.1.1.0.

6. The operational processing block of claim 1, in which one of the communication parameters is a backscatter link frequency.

7. The operational processing block of claim 1, in which
the first inventorying commands are encoded in terms of at
  least a first symbol for data-0 and a second symbol for
  data-1, and
one of the communication parameters indicates a duration
  of one of the first and the second symbols.

8. The operational processing block of claim 1, in which
the first inventorying commands are encoded in terms of at
least a first symbol for data-0 and a second symbol for data-1,
and
one of the communication parameters indicates a ratio of
  durations between the first and the second symbols.

9. The operational processing block of claim 1, in which
one of the communication parameters includes a pilot tone
  indication that indicates whether or not one of the first
  replies should be preceded by a pilot tone, and
one of the first replies is preceded by a pilot tone in accordance with the pilot tone indication.

10. The operational processing block of claim 1, in which
the first inventorying commands and the second inventorying commands are transmitted in a single frequency
  channel, without having transmitted in another frequency channel between when the first inventorying
  commands and the second inventorying commands
  were caused to be transmitted.

11. The operational processing block of claim 1, in which
the first inventorying commands and the second inventorying commands are transmitted out of a single antenna,
  without having transmitted out of another antenna
  between when the first inventorying commands and the
  second inventorying commands were caused to be transmitted.

12. The operational processing block of claim 1, in which
the second inventorying commands are suitable for continuing inventorying those of the RFID tags in the population that are not in the first subgroup, but not suitable
  for continuing inventorying any of those that are in the
  first subgroup.

13. The operational processing block of claim 1, in which
the first inventorying commands are transmitted while a
  current session has been established, the current session
  selected from one of available sessions S0, S1, S2 and S3
  defined consistently with respective sessions S0, S1, S2
  and S3 that are defined in the Gen2 Spec v. 1.1.0
a certain RFID tag of the first subgroup includes a current
  session flag for the current session, the session flag being
  capable of one of two states A and B which is flipped
  responsive to the certain RFID tag becoming inventoried
  by the first inventorying commands, and
the second inventorying commands are caused to be transmitted without having caused the current session flag to
  be further changed during a subsequent transition
  between the first inventorying commands and the second
  inventorying commands being transmitted.

14. The operational processing block of claim 1, in which
the component is further
  for:
    then causing to be established a third set of values for the
      communication parameters, different from the first
      and from the second sets of values; and
    causing to be transmitted third inventorying commands
      that are suitable for continuing inventorying those
      RFID tags in the population that are not in the first
      subgroup or in the second subgroup, but not at least
      one of those that is in the first subgroup and at least
      one of those that is in the second subgroup, the third
      inventorying commands using communication
      parameters having the third set of values,
    in which at least one tag of the first subgroup, at least one
      tag of the second subgroup, and at least one tag of the
      third subgroup are powered from the first and the
      second and the third inventorying commands, and
      remain continuously powered during transitions
      between the first and the second inventorying commands, and the second and the third inventorying
      commands.

15. The operational processing block of claim 14, in which
the component is further for:
  receiving, responsive to the third inventorying commands,
    third replies that are backscattered from a third subgroup
    of RFID tags in the population that does not include the
    first subgroup or the second subgroup, the third replies
    using communication parameters having the third set of
    values.

16. The operational processing block of claim 14, in which
no replies are received from the RFID tags responsive to
  the third inventorying commands.

17. The operational processing block of claim 16, in which
the component is further for:
  then causing to be established a fourth set of values for the
    communication parameters, different from the first and
    from the second and from the third sets of values; and
  causing to be transmitted fourth inventorying commands
    that are suitable for continuing inventorying those RFID
    tags in the population that are not in the first subgroup or
    in the second subgroup, but not those that are in the first
    subgroup or in the second subgroup, the fourth inventorying commands using communication parameters having the fourth set of values.

18. The operational processing block of claim 1, in which
the component is further for:
  causing to be established a zeroth set of values for the
    communication parameters, different from the first and
    from the second sets of values; and
  causing to be transmitted zeroth inventorying commands
    that are suitable for inventorying the RFID tags in the
    population, and receiving, responsive to the zeroth
    inventorying commands, zeroth replies that are backscattered from some RFID tags in the population, at least
    one of the zeroth inventorying commands and the zeroth
    replies using communication parameters having the
    zeroth set of values,
  in which the zeroth replies are received prior to causing the
    first inventorying commands to be transmitted, and
  the zeroth replies are received from some tags in the population that belong in the first subgroup and some in the
    second subgroup.

19. The operational processing block of claim 1, in which
a Received Signal Strength Indicator (RSSI) is determined
  from the first replies, and
the second set of values is caused to be established if the
  RSSI is below a threshold.

20. The operational processing block of claim 1, in which
an error metric is determined about the first replies, and
the second set of values is caused to be established if the
  error metric exceeds a threshold.

21. The operational processing block of claim 1, in which
the second set of values is caused to be established before
  detecting that there are no more first replies.

22. The operational processing block of claim 1, in which
the second set of values is caused to be established responsive to detecting no more first replies.

23. The operational processing block of claim 1, in which
an estimate is obtained for the number of the RFID tags in the population, and
the second set of values is caused to be established responsive to determining that the first replies do not account for the entire population estimate.

24. The operational processing block of claim 23, in which the estimate is obtained as an input from a user.

25. A method for a Radio Frequency Identification (RFID) reader system component to cause inventorying of a population of RFID tags, comprising:
causing to be established a first set of values for communication parameters;
causing to be transmitted first inventorying commands for inventorying the RFID tags, and receiving, responsive to the first inventorying commands, first replies that are backscattered from a first subgroup of RFID tags in the population, at least one of the first inventorying commands and the first replies using communication parameters having
the first set of values;
then causing to be established a second set of values for the communication parameters, different from the first set of values; and
causing to be transmitted second inventorying commands that are suitable for continuing inventorying those of the RFID tags in the population that are not in the first subgroup, but not suitable for continuing inventorying at least one of those that is in the first subgroup, and receiving, responsive to the second inventorying commands, second replies that are backscattered from a second subgroup of RFID tags in the population that does not include the first subgroup, at least one of the second inventorying commands and the second replies using communication parameters having the second set of values,
in which at least one tag of the first subgroup and at least one tag of the second subgroup are powered from both the first and the second inventorying commands, and remain continuously powered during a transition between the first and the second inventorying commands.

26. The method of claim 25, further comprising:
then causing to be established a third set of values for the communication parameters, different from the first and from the second sets of values; and
causing to be transmitted third inventorying commands that are suitable for continuing inventorying those RFID tags in the population that are not in the first subgroup or in the second subgroup, but not at least one of those that is in the first subgroup and at least one of those that is in the second subgroup, the third inventorying commands using communication parameters having the third set of values,
in which at least one tag of the first subgroup, at least one tag of the second subgroup, and at least one tag of the third subgroup are powered from the first and the second and the third inventorying commands, and remain continuously powered during transitions between the first and the second inventorying commands, and the second and the third inventorying commands.

27. The method of claim 26, further comprising:
receiving, responsive to the third inventorying commands, third replies that are backscattered from a third subgroup of RFID tags in the population that does not include the first subgroup or the second subgroup, the third replies using communication parameters having the third set of values.

28. The method of claim 26, in which
no replies are received from the RFID tags responsive to the third inventorying commands.

29. The method of claim 28, further comprising:
then causing to be established a fourth set of values for the communication parameters, different from the first and from the second and from the third sets of values; and
causing to be transmitted fourth inventorying commands that are suitable for continuing inventorying those RFID tags in the population that are not in the first subgroup or in the second subgroup, but not those that are in the first subgroup or in the second subgroup, the fourth inventorying commands using communication parameters having the fourth set of values.

30. The method of claim 25, further comprising:
causing to be established a zeroth set of values for the communication parameters, different from the first and from the second sets of values; and
causing to be transmitted zeroth inventorying commands that are suitable for inventorying the RFID tags in the population, and receiving, responsive to the zeroth inventorying commands, zeroth replies that are backscattered from some RFID tags in the population, at least one of the zeroth inventorying commands and the zeroth replies using communication parameters having the zeroth set of values,
in which the zeroth replies are received prior to causing the first inventorying commands to be transmitted, and
the zeroth replies are received from some tags in the population that belong in the first subgroup and some in the second subgroup.

31. An article comprising: a storage medium, the storage medium having instructions stored thereon, in which when the instructions are executed by at least a Radio Frequency Identification (RFID) reader system component, the instructions result in actions for inventorying a population of RFID tags, the actions comprising:
causing to be established a first set of values for communication parameters;
causing to be transmitted first inventorying commands for inventorying the RFID tags, and receiving, responsive to the first inventorying commands, first replies that are backscattered from a first subgroup of RFID tags in the population, at least one of the first inventorying commands and the first replies using communication parameters having the first set of values;
then causing to be established a second set of values for the communication parameters, different from the first set of values; and
causing to be transmitted second inventorying commands that are suitable for continuing inventorying those of the RFID tags in the population that are not in the first subgroup, but not suitable for continuing inventorying at least one of those that is in the first subgroup, and receiving, responsive to the second inventorying commands, second replies that are backscattered from a second subgroup of RFID tags in the population that does not include the first subgroup, at least one of the second inventorying commands and the second replies using communication parameters having the second set of values,
in which at least one tag of the first subgroup and at least one tag of the second subgroup are powered from both the first and the second inventorying commands, and remain continuously powered during a transition between the first and the second inventorying commands.

* * * * *

UNITED STATES PATENT AND TRADEMARK OFFICE
CERTIFICATE OF CORRECTION

| | | |
|---|---|---|
| PATENT NO. | : 7,830,262 B1 | Page 1 of 1 |
| APPLICATION NO. | : 12/133180 | |
| DATED | : November 9, 2010 | |
| INVENTOR(S) | : Diorio et al. | |

It is certified that error appears in the above-identified patent and that said Letters Patent is hereby corrected as shown below:

Title Page, Item [56] in first page col. 2 (other publications), line 2, please delete "compatability" and insert -- compatibility --, therefor.

Title Page, Item [56] in page 2, col. 2 (other publications), line 1-2, please delete "compatability" and insert -- compatibility --, therefor.

In Claim 13, column 19, line 42, please delete "SO," and insert -- S0, --, therefor.

Signed and Sealed this
Twelfth Day of April, 2011

David J. Kappos
*Director of the United States Patent and Trademark Office*